US009946867B1

(12) United States Patent
Ramalingam et al.

(10) Patent No.: US 9,946,867 B1
(45) Date of Patent: Apr. 17, 2018

(54) INPUT MIRRORING

(71) Applicant: Amazon Technologies, Inc., Seattle, WA (US)

(72) Inventors: Harsha Ramalingam, Kirkland, WA (US); Zachary Damen Wolfe, Seattle, WA (US); Darren Ernest Canavor, Redmond, WA (US); Brian Dang, Seattle, WA (US); Max Funderburk, Seattle, WA (US); Jesper Mikael Johansson, Redmond, WA (US); Bharath Kumar Bhimanaik, Bangalore (IN); Jon Arron McClintock, Seattle, WA (US); Jason Christopher Rudmann, Liberty Lake, WA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

(21) Appl. No.: 14/869,875

(22) Filed: Sep. 29, 2015

(51) Int. Cl.
G06F 17/00 (2006.01)
G06F 12/00 (2006.01)
G06F 12/14 (2006.01)
G06F 13/00 (2006.01)
G06F 17/30 (2006.01)
G06F 21/45 (2013.01)
G06F 3/0488 (2013.01)

(52) U.S. Cl.
CPC .......... *G06F 21/45* (2013.01); *G06F 3/04886* (2013.01); *G06F 17/30914* (2013.01)

(58) Field of Classification Search
CPC . G06F 21/45; G06F 3/04886; G06F 17/30914

USPC .......................................................... 726/18
See application file for complete search history.

(56) References Cited

U.S. PATENT DOCUMENTS

| 7,243,233 B2 * | 7/2007 | Kindberg .............. G06F 21/445 380/247 |
| 7,299,359 B2 * | 11/2007 | Hurley .................... G06F 21/46 713/182 |
| 8,275,992 B2 * | 9/2012 | Ushiku ................... G06F 21/32 713/166 |
| 8,832,804 B1 | 9/2014 | Casey et al. |
| 9,009,814 B1 * | 4/2015 | Wertz ..................... G06F 21/46 713/168 |
| 9,075,986 B1 * | 7/2015 | Cato ........................ G06F 21/52 |
| 2006/0056626 A1 | 3/2006 | Keohane et al. |
| 2008/0118150 A1 | 5/2008 | Balakrishnan et al. |

(Continued)

OTHER PUBLICATIONS

Firtman, M., "Programming the Mobile Web," 2d ed., O'Reilly Media, Inc., California, 2013, Chap. 8, "HTML5 Forms," pp. 235-275.

(Continued)

*Primary Examiner* — Oleg Korsak
*Assistant Examiner* — Feliciano Mejia
(74) *Attorney, Agent, or Firm* — Davis Wright Tremaine LLP

(57) ABSTRACT

Input received into a first component of a user interface is mirrored in another component of the user interface. The first component of the user interface is monitored and changes to the first component are caused to occur in the second component. The first component may be configured to receive user input for an authentication claim.

22 Claims, 16 Drawing Sheets

(56) References Cited

U.S. PATENT DOCUMENTS

| | | | |
|---|---|---|---|
| 2011/0191591 A1* | 8/2011 | Cheng | G06F 21/36 |
| | | | 713/182 |
| 2012/0030165 A1 | 2/2012 | Guirguis et al. | |
| 2012/0124654 A1* | 5/2012 | Senac | G06F 21/36 |
| | | | 726/7 |
| 2012/0306754 A1* | 12/2012 | Jeong | G06F 3/04886 |
| | | | 345/168 |
| 2014/0137216 A1* | 5/2014 | Mohler | G06F 21/45 |
| | | | 726/5 |
| 2016/0012617 A1 | 1/2016 | Maetz et al. | |

OTHER PUBLICATIONS

Nielsen, J., "Stop Password Masking," Nielsen Norman Group, Jun. 23, 2009, <http://www.useit.com/articles/stop-password-masking/> [retrieved Jul. 14, 2015], 2 pages.

Wroblewski, L., "Showing Passwords on Log-In Screens," Lukew.com, Jan. 22, 2015, <http://www.lukew.com/ff/entry.asp?1941> [retrieved Jul. 14, 2015], 11 pages.

McClintock, J. A., U.S. Appl. No. 14/470,886, "Human Readable Mechanism for Communicating Binary Data," filed Aug. 27, 2014.

Johansson, J. M., U.S. Appl. No. 14/572,739, "Computing Device With Integrated Authentication Token," filed Dec. 16, 2014.

* cited by examiner

Password:
PATENTABLE

Representation:
♣♣♣♣♣♣♣♣♣

Password:
PATENTABLE

Input:
P-A-T-E-N-T-A-B-L-E

Input:
P-A-T-E-N-T-Z-B-L-E

INPUT MIRRORING

BACKGROUND

Many computer systems utilize secretly held information for access control and other purposes. Web pages, operating systems, computer programs, and other applications often utilize passwords as a way of authenticating users, where successful authentication is a prerequisite for access to data and/or application functionality. The use of passwords and other secret information, however, often involves competing goals. To enhance security, for instance, password requirements are frequently imposed to increase entropy and, consequently, increase the difficulty of an attacker guessing or otherwise determining the values of passwords. Such requirements may require special characters, multiple types of characters, and other conditions to be met so that passwords differ from words found in dictionaries which may be used for dictionary attacks. Many applications also increase security by preventing passwords from being displayed or otherwise presented, thereby preventing potential attackers from surreptitiously viewing the screen of another to obtain their password. Commonly, characters in a password are replaced with a single character, such as a dot or asterisk. This allows users to see how many characters have been input, but not the individual characters.

The use of passwords and other secrets additionally comes at the expense of usability. In addition to visual and other feedback preventing users from knowing if they have entered a password correctly, passwords are often requested/required on mobile devices which have relatively small screens. On-screen virtual keyboards, for instance, often have individual keys that are smaller than users' fingers, thereby making it very easy to mistype characters in a password. When the characters entered for a password are obscured, users are unable to detect input errors until passwords have been submitted and rejected. One solution to the problem of usability is to simply show passwords on screen in the fields into which the passwords are input. Many keyboard applications, however, have advanced functionality whereby the applications record words that have been input and provide such words as suggestions in the future (e.g., when the first few letters of a word have already been typed). As a result, showing the password often comes at the expense of revealing the password at a later time, perhaps to an unauthorized user as a suggestion for a word being typed.

BRIEF DESCRIPTION OF THE DRAWINGS

Various embodiments in accordance with the present disclosure will be described with reference to the drawings, in which.

DETAILED DESCRIPTION

Figure 1:
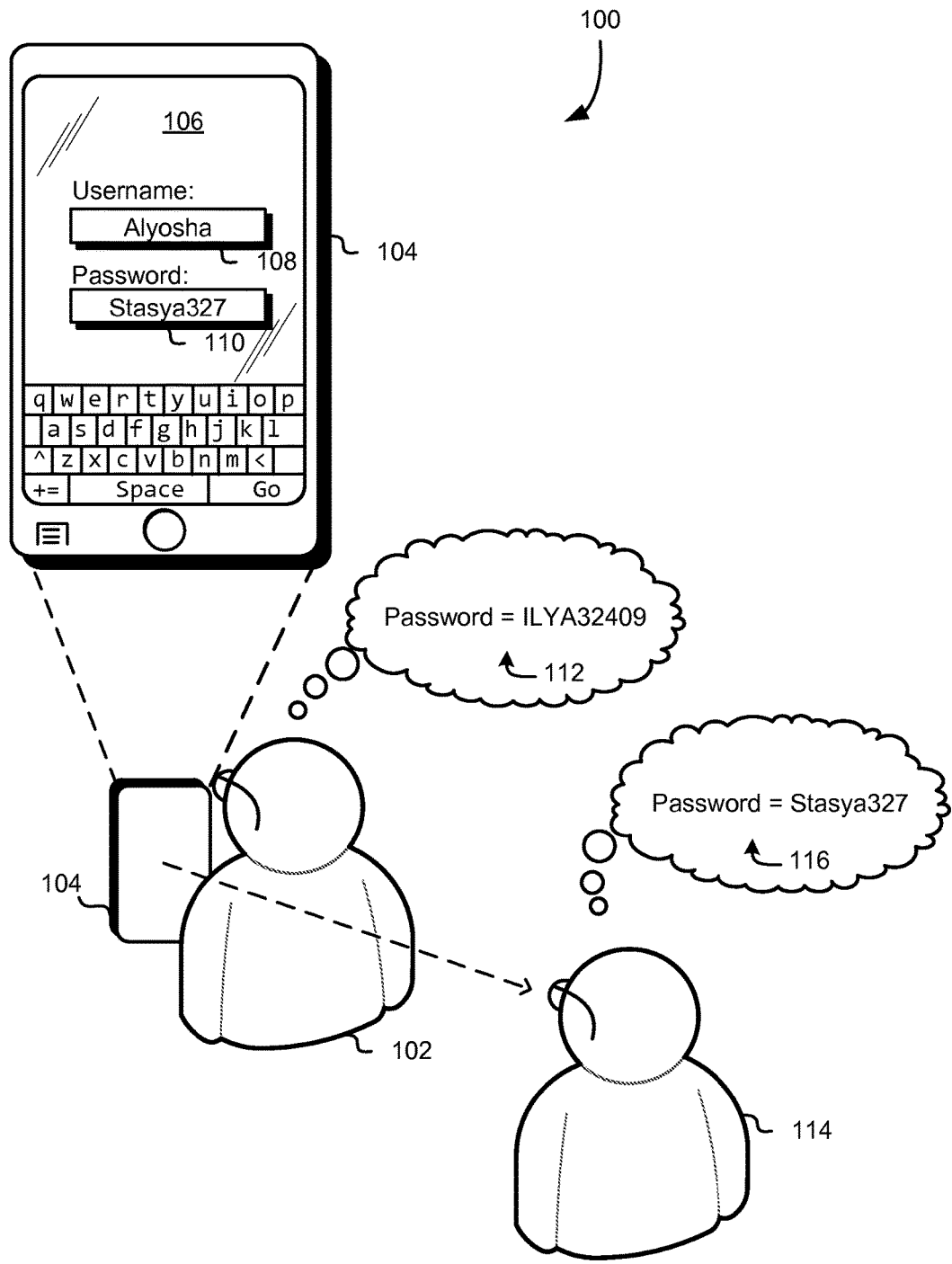
FIG. 1 shows a diagram illustrating a technique for providing symbolic feedback for a password entry field in accordance with an embodiment.

Techniques for providing symbolic feedback for passwords and other fields overcome many of the difficulties discussed above. In one example, a user interface is configured with a password entry field that provides symbolic feedback as to the inputs that have been entered into the password entry field. The user interface is configured such that the symbolic feedback is different from the actual input into the field, but specific to the input that has been made. Further, the symbolic feedback differs from the password itself and, consequently, cannot be used as a substitute for the password. As a result, if input to a password entry field differs from the password itself, the symbolic feedback provided would differ from the symbolic feedback that would be shown had the input to the password entry field been equal to the password. The symbolic feedback may be updated as input is provided to the password entry field, thereby providing a mechanism for users to know when an input error is made before submission of the password and even before inputs to the field are complete. This provides users the opportunity to make corrections without having to input all characters of the password again, as is the case in conventional systems when feedback does not distinguish the specific locations where mistakes have been made.

In some examples, a user interface utilizes a mapping that maps characters to other characters such that, when a character is input, the character to which the input character is mapped is displayed in the user interface. The user interface may provide the ability for users to provide user input to define, at least in part, the mapping. For instance, user input may specify how characters are mapped to each other. So that the user does not need to specifically define the mapping for all characters (which can be an impracticably large set), some of the mapping may be configured automatically. For instance, the user can define how the mapping of the characters that occur in a password are mapped and the mapping of the remaining figures may be performed randomly or otherwise.

Numerous variations of how the mapping is configured may be used. For example, instead of a character-to-character mapping, multi-character sequences may be mapped to other multi-character sequences where the number of characters in one sequence may differ from the number of characters to which the sequence is mapped. In this example, instead of the symbolic feedback being built as user input is received, the symbolic feedback may be completely different as each input is received. This allows the user to recognize correct password entry through the sequence in which the different symbolic feedbacks are received. In another example, mappings do not necessarily map from characters (or multi-character sequences) to other characters (or multi-character sequences). As an example, characters (or multi-character sequences) may be mapped to non-character symbols, non-character images, sounds, vibration patterns and/or frequencies, and/or other things that may be output to a computing device. Further, the device on which the symbolic feedback is provided may differ from the device that receives the user input for the password. As an illustrative example, as user input is received by a mobile device, a watch or pair of glasses or other wearable computing device may output the symbolic feedback through short-range communication with the mobile device.

In another example, a user interface is configured with two fields related to the entry of a password. The first field is a password entry field operating as a conventional password entry field that provides obscured feedback as to the inputs that have been entered into the password entry field. For instance, the field may display a dot, asterisk, or other symbol for each character that has been entered into the field. As a password entry field, keyboard applications do not add words that have been entered into the field to dictionaries for suggestions. Another field may display the state of the password that has so far been entered (e.g., the sequence of characters that has so far been entered). This other field may be configured as one for which user input cannot be provided, thereby preventing a keyboard application from recording the password.

To populate the other field, the device on which the other field is displayed may poll the state of the password entry field to obtain the current state of the set of inputs that has been entered for the password and may update the other field to display the current state that is obtained. Polling may occur at a frequency that is frequent enough to provide nearly instant feedback of changes to the state of the password entry field, but infrequent enough to conserve resources by unnecessary polling. In some examples, the frequency changes with the current state of various resources (central processing unit (CPU) load, battery level, current traffic on a communications bus, an amount of volatile memory being utilized, and/or other measures of resources whose performance can be adversely affected by polling. Specifically, the frequency may be slowed as a state of a set of resources indicates increased load on one or more resources in the set. The device may obtain the state of the password entry field in other ways, such as by subscribing to changes to the password entry field, by receiving notifications each time input is provided to the password entry field, and in other ways.

The techniques described above and also below may be combined to provide additional advantages. For instance, in implementations that utilize separate fields to prevent keyboard applications from recording passwords, the symbolic feedback may be not the state of the password itself, but a representation of the state of the password entry field utilizing a mapping such as described above. Further, the representation may be provided on another device than the device into which the password is input. Other variations include those where the password itself is obscured or completely removed from view in a graphical user interface. In some examples, for instance, a user interface is configured such that the other field overlays the password entry field, but user input can nevertheless be provided into the password entry field. In this manner, the user interface is configured to provide the visual impression that user input is provided into a field that shows exactly what is input (or a symbolic representation of that which is input) and the use of two different fields is not visually detectable by the display of the user interface itself.

In the preceding and following descriptions, various implementations have been and will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 is a diagram 100 illustrating various aspects of the present disclosure. In an embodiment, a user 102 utilizes a mobile device 104. The mobile device may be, for instance, a cellular telephone or tablet computing device, although other devices configured with user interfaces are considered as being within the scope of the present disclosure. Additional suitable devices include, but are not limited, to those discussed below. As illustrated in FIG. 1, the mobile device 104 displays a user interface 106 which includes a username field 108 and a password entry field 110. The username field 108 and the password entry field 110 may be used to receive user input for a set of credentials (in this example, username and password) that are used to access data and/or functionality accessible through the mobile device 104. The user interface may, for instance, display a lock screen into which valid credentials are required to access functionality of an operating system of the mobile device 104. As another example, the user interface 106 may be a component of an application executing on the mobile device 104 and valid credentials may be required for accessing functionality of the application. In yet another example, the user interface 106 may be a screen of an operating system of the mobile device that is used to access functionality after the device has been unlocked through a lock screen. Such functionality may include, for example, the ability to change administrative settings, the ability to access certain data, and the like. In yet another example, the user interface 106 may be a web page displayed through a browser application where valid credentials are required for the purpose of accessing functionality of the webpage, such as access to account-specific information, access to other data, and the like. Note that, while a username and password are provided as an illustrative example, the techniques described herein are applicable to other types of credential sets and, generally, to any type of data (not necessarily data that is part of a credential) that may be input into a user interface.

Note that password entry fields and username fields are example components of graphical user interfaces and that other components of graphical and/or other user interfaces may be used for the receipt of input for which the techniques of the present disclosure can be applied. As an example, different types of authentication may utilize non-alphanumeric input, such as gestures recorded through a camera, the drawing of figures on a screen, selection of objects on a screen, voice-generated sounds, and/or other types of input. Such input, while not alphanumeric, can be used to generate values that can be mapped to other values in accordance with techniques described herein. For instance, a Fourier transform may be applied to voice input to generate a set of numbers corresponding to frequencies recorded. As another example, a fingerprint algorithm may be used to characterize user input and the fingerprint may be mapped to other information that can be used to update a user interface using techniques described herein. Generally, the techniques described herein are applicable to input entered for the purpose of generation of an authentication claim.

Note that, while passwords and other information that can be used for authentication claims are described herein for the purpose of illustration, the techniques can be adapted for other fields that are used for other types of information that is not necessarily used to generate an authentication claim. For example, the techniques described herein can be used to provide symbolic feedback for other types of data that can be entered into a user interface, such as credit card numbers, bank account numbers, social security numbers, person identification numbers (PINs), personally identifiable information, and other information which is not necessarily information classified as sensitive. Further, while the techniques described herein use a mobile device with a graphical user interface for the purpose of illustration, the techniques may be adapted for other types of devices, such as those listed below, and others.

In some examples, the techniques described herein are used to provide symbolic feedback for the entry of a PIN in an automated teller machine (ATM) interface or a television interface (e.g., to purchase or otherwise consume digital content). A mapping, such as described in more detail below, may be personal to a user and may be stored on the user's device and/or in another location (e.g., on a bank card or other instrument usable for payment transactions). In embodiments where a mapping is stored server-side, the client (e.g., mobile device) may transmit the inputs that it receives through an associated input device to a server that has access to the mapping and the server may, after applying the mapping, provide a representation (symbolic feedback) to the client for display or to otherwise be provided. In some examples, the mapping is a composite mapping. For instance, one mapping may be stored client-side and another mapping may be stored server side. The client may apply its mapping (e.g., a hash function) to inputs received and provided mapped inputs to the server which may apply its own mapping to be provided back to the client. In this manner, the actual characters of the password or other information do not need to be transmitted over a network, but the techniques may still be applied using a server-side mapping.

In other examples, the techniques described and suggested herein are applicable to point of sale (POS) terminals. A user may, for instance, be prompted for entry of a PIN into a POS terminal, which may be a dedicated POS terminal or another device configured to operate as a POS terminal, such as a device with hardware enabling participation in payment processing (e.g., a mobile phone or tablet with a peripheral credit/debit card reader device communicatively attached to the mobile phone or tablet). In some instances, entry of a PIN or other code into a user interface of the POS terminal and, using techniques described below, a representation of the PIN (e.g., the PIN itself or a symbolic representation of the PIN which may differ from the PIN may be transmitted to another device (e.g., mobile phone, wrist watch, eyeglasses) via short-range or other communication for presentation (e.g., display) by the other device.

In the example illustrated in FIG. 1, the user 102 has an associated password 112 that can be used in a set of credentials to gain access to functionality, such as described above. However, in this example, the user interface 106 of the mobile device 104 displays not the password 112, but a symbolic representation 116 of the password 112. As a result, entities with access to the visual state of the user interface 106, such as another person 114 or other entities, such as cameras able to record the visual state of the user interface, do not receive information that indicates what the password 112 is. For example, the other person 114 sees only the symbolic representation and, if the other person were to attempt to use the symbolic representation 116 of the password 112 to try to gain unauthorized access to the functionality for which the set of credentials is valid, such an attempt would fail. In this manner, the user 102 can safely enter his/her password into the user interface 106 and obtain symbolic feedback regarding whether the sequence of characters he/she has entered is correct while greatly reducing the ability of others to observe the screen of the mobile device 104 and thereby determining the user's 102 password.

Numerous variations of the techniques described herein are considered as being within the scope of the present disclosure and the techniques of the present disclosure can be utilized to enable additional techniques that enhance information security. For example, in some embodiments, representations of passwords (or other values) or derivations thereof (e.g., hashes) may be stored (e.g., in a database in association with account identifiers). Authentication attempts (or other actions (e.g., form submission)) or log entries thereof may trigger a lookup from the database to determine whether a symbolic representation of information was used in place of the information itself, thereby indicating an attempted security breach. As an illustrative example, referring to FIG. 1, submission of "Stasya327" or a hash thereof in an authentication claim that involved the username "Alyosha" may trigger a notification of an attempted breach. Additional action may also be triggered, such as enhanced logging of information about the breach (e.g., a network address from which the information was submitted) to enhance the forensic information available. In another example, a message (e.g., email, SMS, or other message) may be transmitted to a network address associated with the username that indicates the attempted breach, thereby prompting the authorized user to take additional precautions (e.g., entering passwords further out of view of others).

Figure 2:
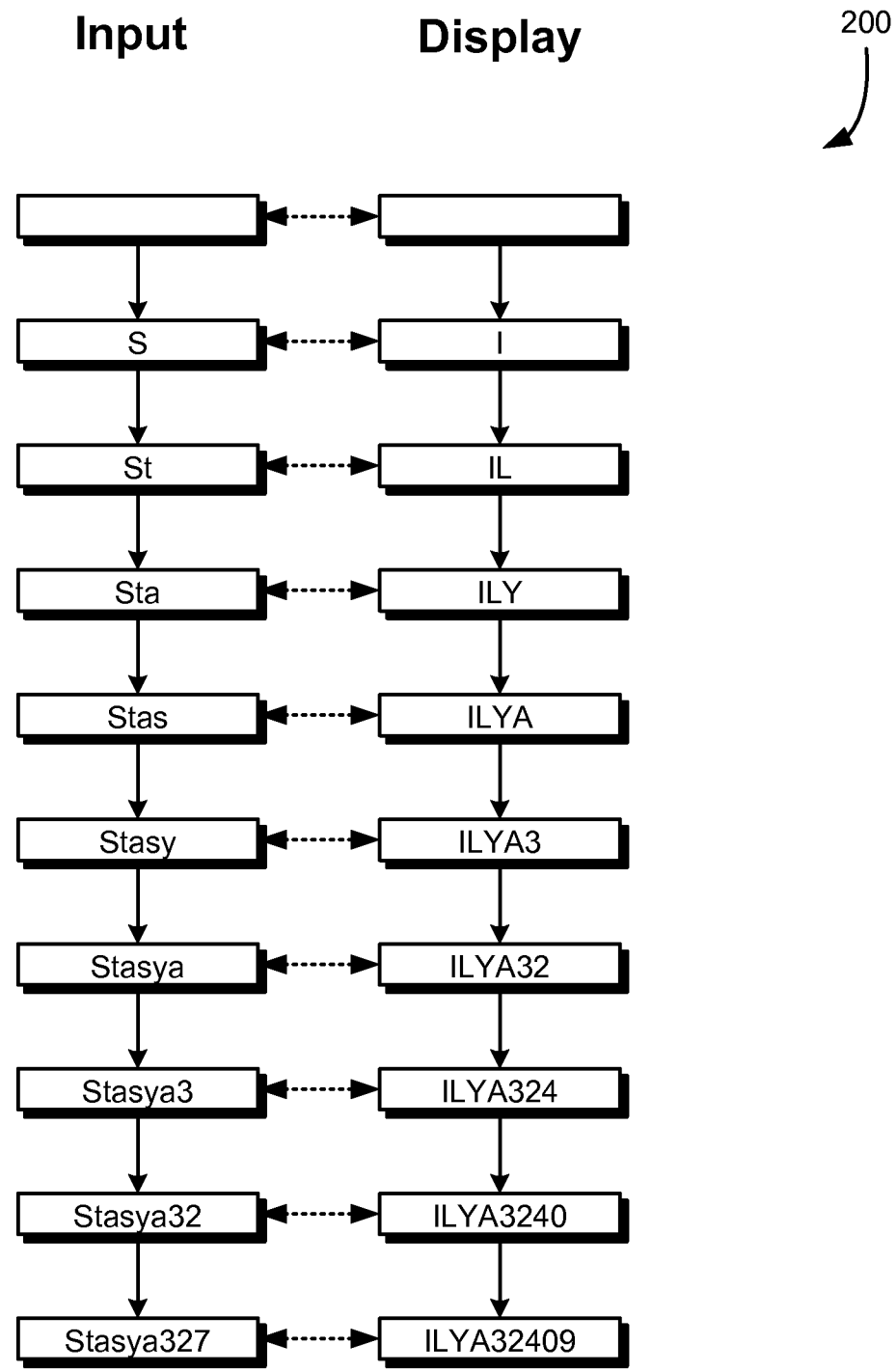
FIG. 2 shows an illustrative example of how a mapping may be applied as user input is received, in accordance with an embodiment.

As noted above, different ways of generating symbolic feedback as to the sequence of characters that have been entered for a password are within the scope of the present disclosure. FIG. 2 is a diagram 200 illustrating one way in which symbolic feedback may be generated and displayed. In this figure, two columns are presented. In a left-hand column, boxes illustrate the state of user input that has been entered into a password entry field. Arrows indicate the state changes as characters are entered. At an initial stage, a password entry field has been displayed on a user interface, but user input for the password entry field has yet to be received. As a result, the display for the field is empty. Note, however, that there may be something in the display at this initial stage, such as a string with an instruction, such as "Enter Password."

In the example of FIG. 2, there is a one-to-one, character-to-character mapping that is used to generate the display as input for the password entry field that is displayed. In this example, input for the character "S" has been received, such as through a keyboard application for a virtual keyboard or an actual keyboard. Because, in this example, the letter "S" is mapped to the letter "I," the display shows the letter "I." A user viewing a display would know the mapping, at least with respect to characters in his/her password, and, therefore, whether the first character of the password was entered correctly. For instance, assuming that the first character in the valid password is "S," the user would expect the display to show the letter "I." If a different letter appeared, this would serve as an indication that the first character was entered incorrectly.

As user input is received into an input device (e.g., touchscreen, physical keyboard, or other device), the mapping is applied to update the display. For instance, in this example, the second character entered is "t," which is mapped to the letter "L." Consequently, the letter "L" appears in the display after the "I" that was previously displayed. Note that, for the second character, a lowercase letter is mapped to an uppercase letter. Continuing in the example, when user input for the letter "a" is received, a "Y" appears concatenated to the end of the "IL" that was already displayed. This repeats as user input is received. After user input for complete password has been received, a representation of the complete password appears in the display. A user may have memorized (or otherwise memorialized (e.g., written down, perhaps in a list of many variations)) the representation of the complete password and, as a result, can quickly identify whether there are any errors in the inputs that he/she has made into the device that receives the user input. Note that, when a user manipulates an input device, the input device may generate signals that encode user input. Thus, it can be said that information is received from the input device. The information that is received, possibly after decoding and/or other processing of the signals, may be referred to as a result of the input.

In addition, this particular example enables the user to determine exactly where in the password the error was made. For instance, if the $n^{th}$ character in the representation of the complete password (n a positive integer) was different than expected, the user would know that there was an error in the $n^{th}$ character of the password. In many implementations, the user can use this knowledge to delete the erroneous character and replace it with another character. From the perspective of that which is displayed, correction of an entered password may appear as if the symbolic representation of the password is being corrected. For example, if the nth character in the symbolic representation is deleted, the nth character of the symbolic representation disappears from the display as with a conventional text entry. The state of the password entry field in memory is updated accordingly (i.e., to delete the character mapped to the character of the symbolic representation that was deleted). Generally, as characters are received and deleted, the state of the display and the state of the password in memory are updated to match in accordance with the particular mapping that is being applied.

Note that, while FIG. 1 shows user input being received on a character-by-character basis, user input may be received in other ways. For example, a cut and paste operation may result in user input for multiple characters being received at the same time. The display may be updated accordingly by including, in order, a character mapped to one of the multiple characters, for each of the multiple characters. Note also that the sets between which characters are mapped may be the same or may differ. For example, in some applications, the characters that are valid for passwords form a proper subset of a larger character set. The characters to which these characters are mapped may be from this proper subset or from another set, which may be a superset of the proper subset, may be a disjoint set, or may have a non-empty intersection with the proper subset. In some examples, valid characters for a password may be mapped to any Unicode character, which may be implemented using a Unicode encoding, such as UTF-8 or UTF-16. Other character sets and encodings may also be used in different embodiments.

Figure 3:
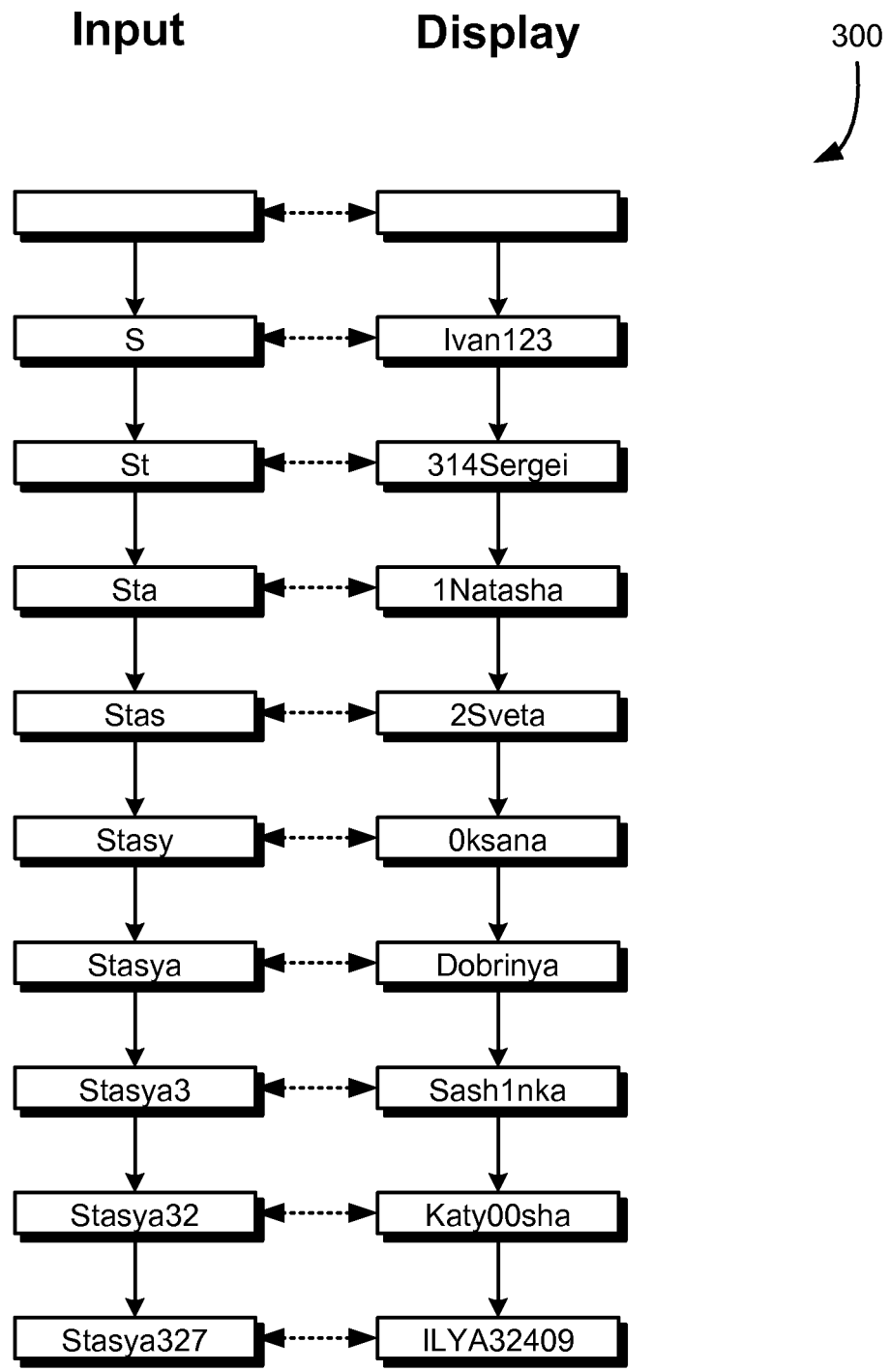
FIG. 3 shows another illustrative example of how a mapping may be applied as user input is received, in accordance with an embodiment.

FIG. 3 shows a diagram 300 illustrating at least two different techniques for generating a symbolic representation of user input, in accordance with an embodiment. The manner by which FIG. 3 illustrates various principles is configured in accordance with the illustration in FIG. 2. For example, a left column indicates the state of a password in memory according to user input that has been received, and a right column indicates what is displayed on a display (e.g., in a field of a form on the display). Solid, vertical arrows indicate state changes to both the password in memory and the display. Dotted arrows indicate application of a mapping to determine the display from password in memory.

In this example, instead of mapping input to output on a character-by-character basis, mappings involve sequences of characters. In a first example implementation, every subsequence of a password is mapped to a different sequence of characters. In this example, the first non-empty subsequence is the letter "S," which is mapped to the sequence "Ivan123." Thus, after user input for "S" has been received, the sequence "Ivan123" appears in the display. As the password in memory is built up as user input is received, the next subsequence of the password as entered is "St." The subsequence "St" is mapped to "314Sergei." Consequently, after user input for "St" has been received, the display is updated to show "314Sergei." For example, if the characters "S" and "t" are entered in order, "314Sergei" may replace "Ivan123" in a field of the display. In another example, "314Sergei" may be added to a list of words after "Ivan123." Similarly, the next subsequence (assuming password characters are entered in order) is "Sta," which is mapped to "1Natasha." The sequence "1Natasha" may be used to update the display, as discussed above.

As a result of the mapping of sequences to sequences, the user is able to determine whether password input is correct by the sequence of words that appear as password inputs are received by the device that receives user input. For instance, assuming the correct password begins with "Sta," an authorized user would know that, as the first three characters of his/her password are entered, the display should show, in order, "Ivan123," "314Sergei," and "1Natasha." If a different character sequence appears, the user would know that an error was made and may take corrective action, such as by providing user input for "delete" to remove the last character from the sequence in memory for the password, and may provide user input for a different character.

In this first example implementation, different embodiments may involve different operations in the event user input for a password is incorrect. In some examples, an incorrect subsequence of a password may have a corresponding sequence to which the incorrect sequence is mapped by a mapping where the correspondence is explicitly stored (e.g., in a table). As a result, the sequence mapped to the incorrect subsequence of the password may be used to update the display as above. However, in many implementations, it is impractical to explicitly store a table or other data structure with an entry for every sequence. In such examples, the mapping may be dynamically determined, such as by generating a random sequence to display, inputting the current sequence of the password into a function (e.g., a hash function) that deterministically determines the output for the display, or otherwise. Note that a data structure that stores direct correspondences between pairs can be referred to as an explicit mapping while a function that can be applied to input to generate (e.g., by calculating a message authentication code) output without an explicit lookup of the corresponding output in a data structure may be referred to as an implicit mapping.

Also in the first example implementation (and others), the mapping may be configured in accordance with security needs. For instance, a device that applies the mapping may include an explicit sequence-to-sequence mapping, such as in a table, where an explicit mapping is a mapping where a lookup operation can be performed to determine a correspondence (e.g., by looking up the correspondence in a table). An explicit mapping is in contrast to an implicit mapping, in which a lookup is insufficient for determining a correspondence. An implicit mapping may include performing a calculation (e.g., output of a hash function) to determine any given correspondence. An implicit mapping may allow for the correspondence between members of large sets to be stored efficiently. Returning to this example, the explicit mapping may contain an entry for a set of subsequences of the correct password. This set may be formed of all subsequences starting with the first character of the password, all non-empty subsequences of the password, or otherwise.

To enhance security, the explicit mapping may include entries for subsequences that do not appear in the password to increase the difficulty of someone with unauthorized access to the explicit mapping from determining the password from the entries in the explicit mapping. The number of such additional sequences may be high enough to satisfy security needs for any particular application. For example, the number of entries in the explicit mapping may be such that a random selection of an entry from the explicit mapping has a probability of being the correct password that is less than some specified threshold that is specific to a level of security desired. The threshold may be, for instance, such that the probability of correctly selecting the password from the explicit mapping before additional controls (e.g., limits on the number of wrong password submissions) are applied is below a specified level.

In some examples, a mapping involves a dictionary of words that act as a symbol table. Subsequences of input into a field can be used to form a representation of a password that comprises a set of words, where the number of words is shorter than the number of characters in the password. Example techniques for such mappings and additional variations on mappings are described in U.S. patent application Ser. No. 14/470,886, filed Aug. 27, 2014 and entitled "Human Readable Mechanism For Communicating Binary Data," which is incorporated herein by reference.

In other examples, a result of a previous invocation of a mapping is used to generate a result of the mapping to produce a symbolic representation of a password or other input. In a specific example, a mapping is configured such that $r_n=\text{HMAC}(/\text{delta}, r_{n-1})$, where/delta represents a difference between a previous state of a password entry field and a current state of the password entry field (e.g., /delta may be the most recent character that was entered for a sequence of characters that defines the password) and HMAC is a hash-based message authentication code. As an example, if the state of the password entry field was "Stas" and then was changed to "Stasy," the result of the mapping can be calculated as or otherwise based at least in part on: $r_n=\text{HMAC}("y", r_{n-1})$. Note that $r_0$ may be a seed value that is programmed into an application that utilizes the mapping or is otherwise determinable. As the user enters user input, $r_n$ may be calculated and used to update a user interface. For example, a mapping may be used to determine output from the message authentication code using the techniques described and incorporated by reference in the previous paragraph. As another example, a function may be used to map the resulting message authentication codes to a color space and the user interface may be updated to display the corresponding color (e.g., either as a sequence of objects each having a color from a corresponding message authentication code or by replacing, in a display, an object of a previously determined color with the currently determined color).

In various embodiments, mappings are specific to a user, an account, a device, and/or otherwise so that one with a view of a screen or other access to a user interface can only determine whether a representation of a password corresponds to the correct password. In some examples, an authorized user sets their own mapping or at least a portion thereof, such as described below, and in other examples, the mapping is randomly generated. Note that, even if the mapping is randomly generated, the user may learn the representation (or a set of representations) corresponding to the correct password, such as through multiple password entry attempts enabling memorization.

In a second example implementation whose result is illustrated in FIG. 3, each character of a set of characters (e.g., the set of characters that are valid for a password) is mapped to a sequence. For instance, referring to FIG. 3, "S" is mapped to "Ivan123," "t" is mapped to "314Sergei," "a" is mapped to "1Natasha," and so on. In this example implementation, the last character of the entered password in memory is used to determine what is displayed in the display. After user input for the letter "S" is displayed, the sequence "Ivan123" is displayed. After "t" is entered (after "S"), "314Sergei" is displayed, such as by replacing or supplementing "Ivan123." This process continues as user input for the password is received.

In this manner, the sequence of words that is displayed on the display serves as an indication of whether a password has been entered incorrectly. For example, referring to FIG. 3 and assuming the correct password begins with "Stas," the sequence of words that are displayed (either in turn, or simultaneously) begins with {Ivan123, 314Sergei, 1Natasha, 2Sveta}. If a different sequence of words is displayed, this serves as an indication that there has been an error in password entry. Further, the place in the sequence of words that differs from what is expected with a correct password serves as an indication of the specific character in the password that was entered incorrectly.

Figure 4:
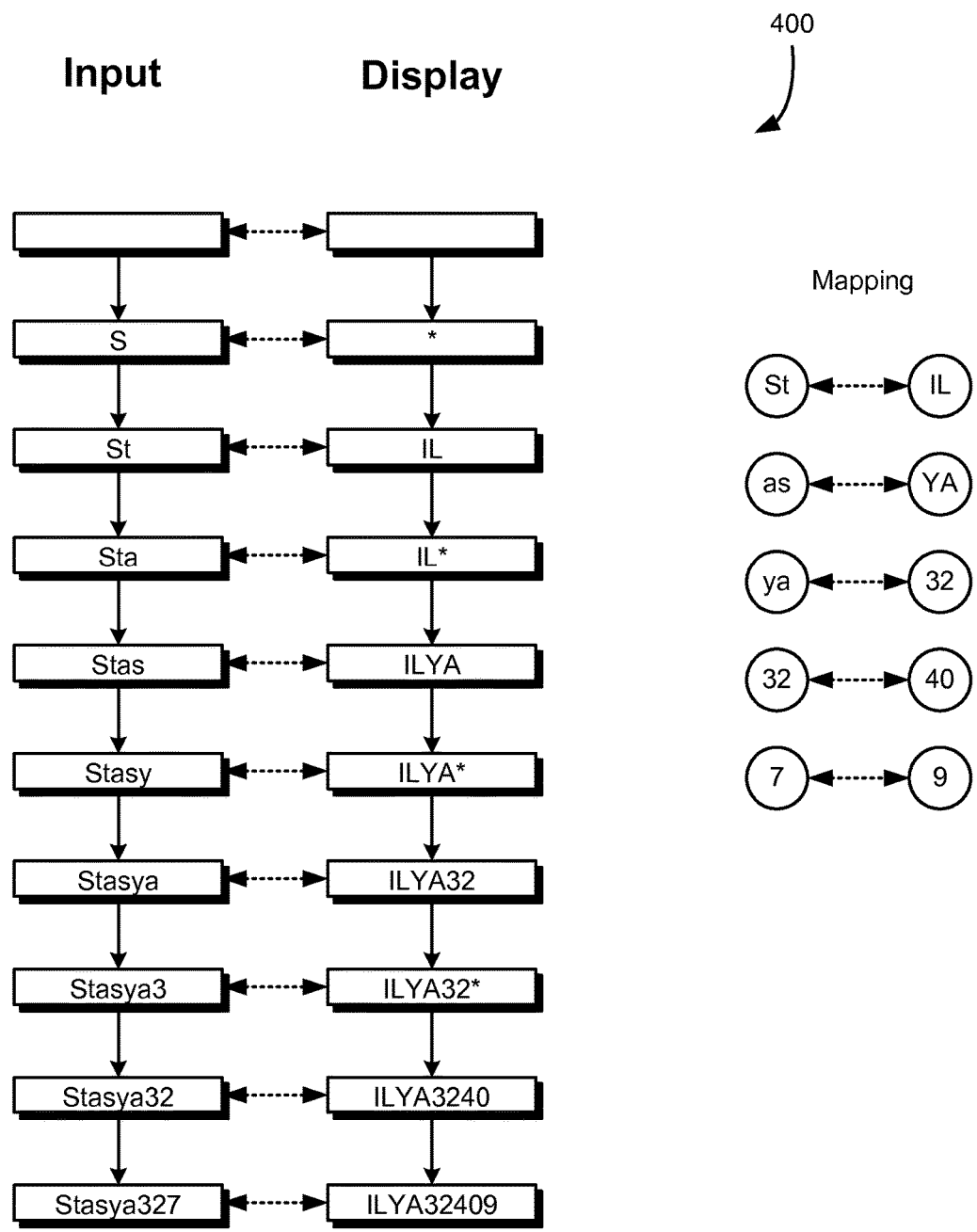
FIG. 4 shows another illustrative example of how a mapping may be applied as user input is received, in accordance with an embodiment.

FIG. 4 shows a diagram 400 illustrating various aspects of the present disclosure. The manner by which FIG. 4 illustrates various principles is configured in accordance with the illustration in FIG. 2. For example, a left column indicates the state of a password in memory according to user input that has been received, and a right column indicates what is displayed on a display (e.g., in a field of a form on the display). Solid, vertical arrows indicate state changes to both the password in memory and the display. Dotted arrows indicate application of a mapping to determine the display from password in memory.

In the example of FIG. 4, character pairs are mapped to character pairs. This is a specific example of a mapping of sequences mapped to other sequences, where sequences of a pair of mapped sequences are not necessarily the same size. As illustrated in FIG. 4, in this example, the pair of characters "St" is mapped to "IL," the pair of characters "as" is mapped to "YA," and other mappings occur as illustrated in the figure. As user input for a password entry field is received, the length of the sequence defined by the user input varies and, at any given time, the length of the sequence can be equal to one or zero, modulo two. For example, after receipt of user input for the letter "S" that begins the password, the length of the password entered so far is one. As such, in this example, there is no pair to which "S" is mapped. In this example, the "S" is replaced with an asterisk in the display. However, after user input for the "t" is received after input for the "S," the state of the password in the password entry field is "St" which, as noted, is mapped to "IL." Accordingly, the asterisk in the display is replaced with or supplemented with "IL." After the third character, "a," is entered, resulting in the state of the password entry field being "Sta," the display includes "IL*" since "St" is mapped to "IL," but "a" does not have a mapped sequence. This pattern continues as user input for the password is received.

As illustrated in FIG. 4, the mapping may be configured such that, if the password has a length of one modulo two, the final character can be mapped to another sequence. In this example, the final character "7" is mapped to a single-character sequence, "9." In this manner, the user can see the final symbolic representation of the password in the display to determine whether he or she has entered the password correctly.

As with all techniques illustratively discussed herein, variations of the technique described in connection with FIG. 4 are considered as being within the scope of the present disclosure. For example, in the specific example of FIG. 4, the mapping may be configured such that single characters are mapped to other sequences so that the last characters of sequences having length equivalent to 1 modulo 2 can be replaced with a corresponding sequence (that differs among the single-letter sequences that can form the last character). More generally, the mapping may be configured such that a sequence may have another sequence mapped to it, but if the sequence grows in length (by receipt of additional user input), that sequence may change, and the changed sequence may have another sequence mapped to it. As with other techniques described herein, the mapping may be configured in accordance with various security concerns such that, for instance, the difficulty of determining a password given access to the mapping is sufficient.

Figure 5:
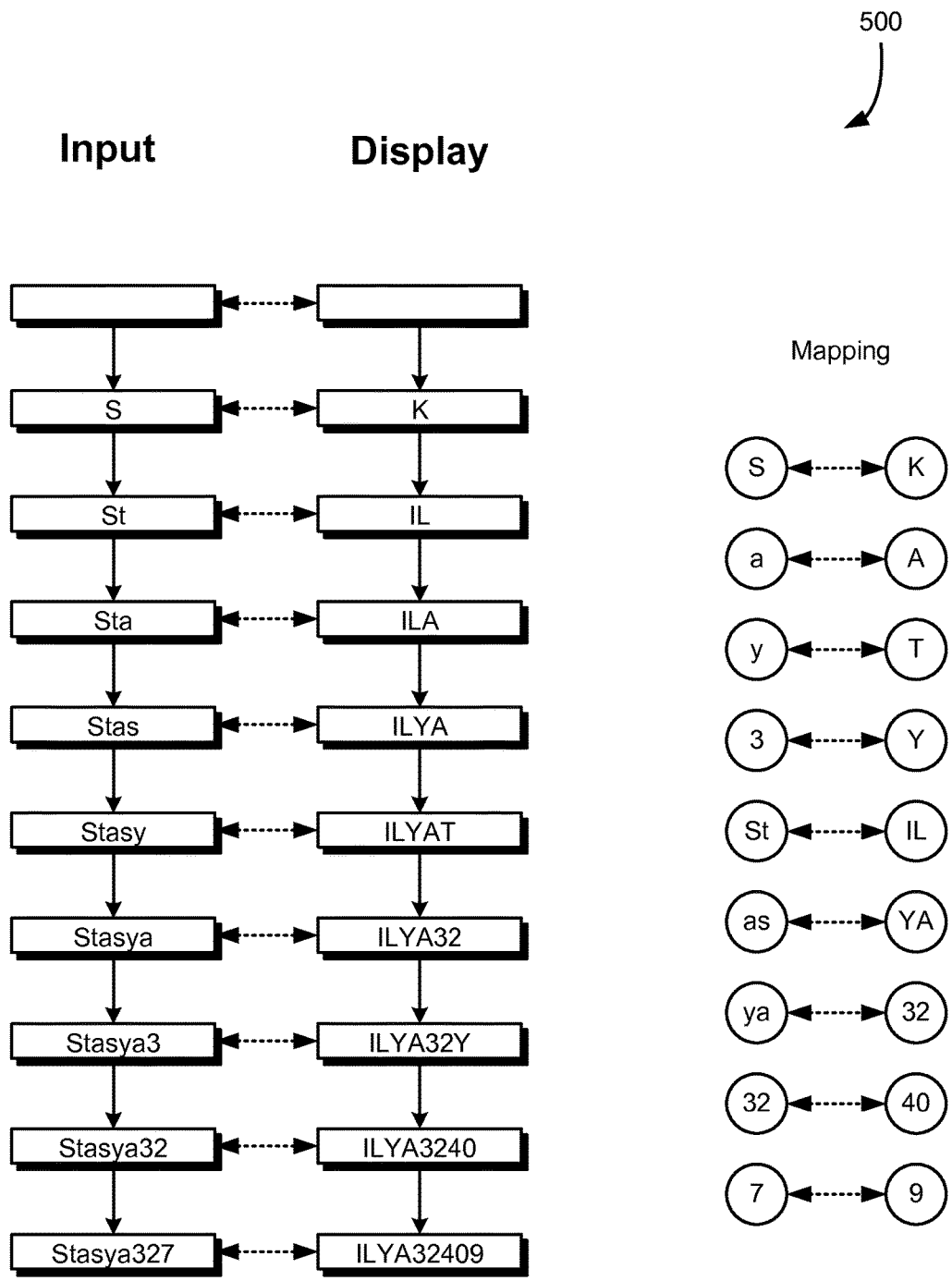
FIG. 5 shows another illustrative example of how a mapping may be applied as user input is received, in accordance with an embodiment.

FIG. 5 illustrates a variation of the technique illustrated in FIG. 4 wherein both single-character sequences and two-letter sequences are mapped to one another. The manner by which FIG. 5 illustrates various principles is configured in accordance with the illustration in FIG. 2. For example, a left column indicates the state of a password in memory according to user input that has been received, and a right column indicates what is displayed on a display (e.g., in a field of a form on the display). Solid, vertical arrows indicate state changes to both the password in memory and the display. Dotted arrows indicate application of a mapping to determine the display from password in memory.

As illustrated in FIG. 5, the letter "S" is mapped to the letter "K," but the two-character sequence "St" is mapped to "IL." As a result, when user input for just "S" is received, the display shows the letter "K." However, when user input adding the "t" to the "S" is received, the password entry field contains the sequence "St" and the "K" gets replaced (or supplemented) with "IL," in the display. Similarly, in this example, as user input is received, single-character sequences are replaced (or supplemented) with two-character sequences as the two-character sequences are constructed by the user input being received. For instance, when user input for the first three characters has been received, the display contains "ILA" since "St" maps to "IL" and "a" maps to "A." However, when user input for a fourth character is received (in this example, resulting in the sequence in the password entry field memory being "Stas"), the display consequently contains "ILYA" since "as" is mapped to "YA." This continues as user input is received and, using the mapping in the figure, the display contains "ILYA32409" since "St" maps to "IL," "as" maps to "YA," "ya" maps to "32," "32" maps to "40," and "7" maps to "9."

More generally, the manner in which the display is updated in this example involves starting at the beginning of a sequence of characters in the password entry field and replacing the largest subsequence starting at the initial character that has a sequence in the mapping with its mapped value. From that point, a new sequence is constructed until the largest sequence found in the mapping is used. This continues until the sequence in the password entry field memory is complete.

As with other techniques described herein, the mapping may contain other subsequences and mappings in addition to those subsequences that appear in the valid password. This enables the mapping to be used in instances when incorrect user input for the password has been received and also to increase the difficulty of determining the password from the mapping. In addition, in some examples, not all possible sequences are found in the mapping and, in case user input results in a sequence that does not occur in the mapping, a system utilizing techniques described herein may generate a mapped value dynamically, such as by randomly determining the mapped value or using a deterministic function to determine the mapped value. Default characters and/or symbols may be used for incorrect user input not found in the mapping that is being utilized.

Figure 6:
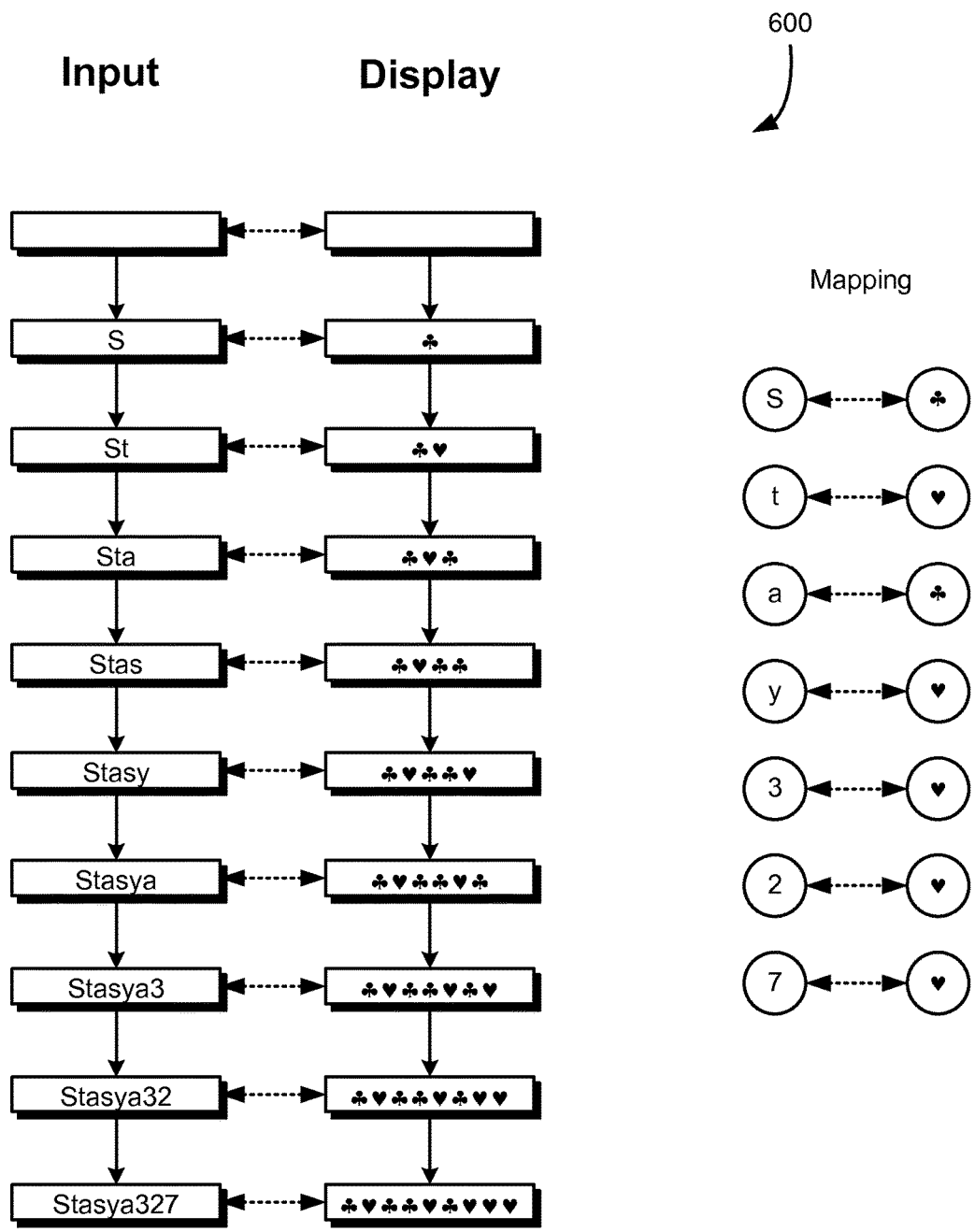
FIG. 6 shows another illustrative example of how a mapping may be applied as user input is received, in accordance with an embodiment.

As noted above, a mapping used to determine what to display in a user interface may not be one-to-one. In some examples, the different sequences are mapped to the same sequence. In addition, in many embodiments, mappings do not necessarily need to exclusively utilize alphanumeric characters. Turning to FIG. 6, for example, the figure shows a diagram 600 illustrating a variation of techniques described above where many different sequences are mapped to the same sequence and where non-alphanumeric symbols are used. The manner by which FIG. 6 illustrates various principles is configured in accordance with the illustration in FIG. 2. For example, a left column indicates the state of a password in memory according to user input that has been received, and a right column indicates what is displayed on a display (e.g., in a field of a form on the display). Solid, vertical arrows indicate state changes to both the password in memory and the display. Dotted arrows indicate application of a mapping to determine the display from password in memory.

In this example, single-character sequences are mapped to symbols, specifically suits from a deck of cards: clubs, hearts, diamonds, and spades. As illustrated in the figure, "S" and "a" are mapped to a club and "t," "y," "3," "2," and "7" are mapped to a heart. As a result, for user input received for the password of "Stasya327," the display includes the following sequence: club, heart, club, club, heart, club, heart, heart, heart. A user viewing the display would recognize the pattern of symbols and, if the pattern were not correct, the user would know where in the sequence of entered characters the error was made so that the user can correct without re-entering the complete password.

As with all examples discussed above, the user interface may be configured such that editing the characters in the display results to corresponding edits in the password entry field memory. For example, deletion of the first club in the last sequence illustrated in the figure would result in the deletion of "S" from the password entry field memory in the first position, thereby leaving "tasya327" in the password entry field memory. More generally, deletion of the $n^{th}$ character (n a positive integer) results in deletion of the nth character in the password entry field. In implementations where the mapping maps sequences of differing lengths, editing of the display may be performed by taking the result of what is left in the display and applying a reverse mapping. For instance, referring to FIG. 5, the longest sequence in the display that contains the initial character in the sequence and has a mapped value from possible password inputs may be used to determine the initial sequence in the password memory, and additional mapping rules may be applied to the remainder of the sequence that is in the display to determine the value for the password entry field.

Numerous techniques may be utilized to determine the mappings that are utilized using the various techniques described herein. In some examples, the mapping is generated automatically, such as by using a pre-existing mapping or generating the mapping at the time the password is created. In some examples, the mapping is randomly generated. In other examples, the mapping is deterministically generated (e.g., by using a function). Generation of a mapping may be subject to various constraints. For example, as noted above, a mapping may have an explicit portion and an implicit portion, where the explicit portion is usable with lookups and the implicit portion involves calculations. In implementations where the domain for the mapping makes storage of a complete explicit mapping impractical (e.g., because the domain is so large that storage of a complete explicit mapping would be impractical or even impossible), the explicit portion of the mapping may be generated so that all portions of the correct password in the domain of the mapping are mapped explicitly. As an illustrative example, if the domain of the mapping has differing size subsequences of characters, the mapping may be generated to include all subsequences that occur in the correct password. As noted above, additional constraints may involve the size of the domain that occurs in the explicit portion of the mapping to increase the difficulty of determining the password from the mapping. In this manner, should the mapping become compromised, the password is nevertheless sufficiently difficult to determine.

Figure 7:
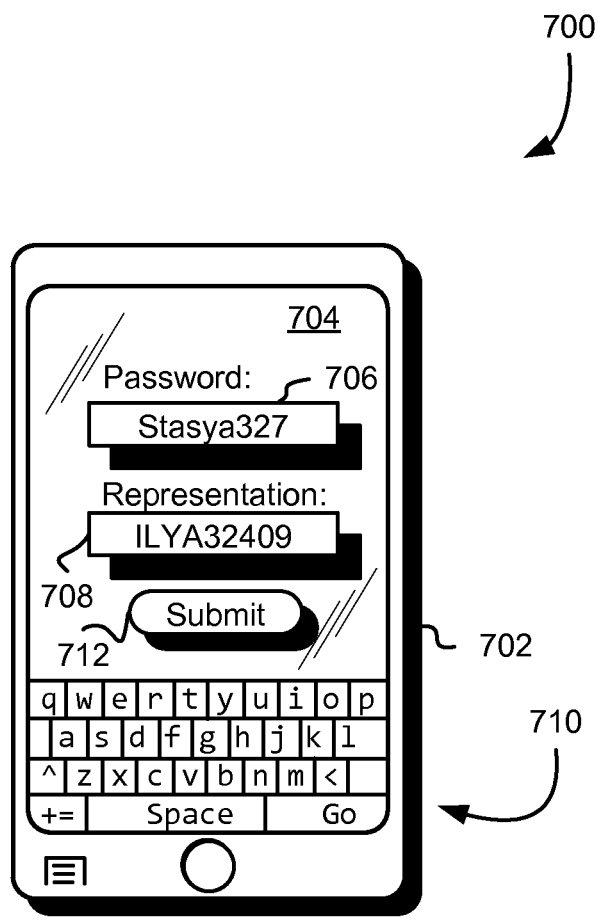
FIG. 7 shows an illustrative example of a user interface for configuring a mapping in accordance with an embodiment.

The manner by which mappings may be set may vary in accordance with various embodiments. FIG. 7, for instance, shows a diagram 700 illustrating one way in which a mapping may be set on a mobile device 702, although similar techniques can be used on other devices that are not necessarily classified as mobile devices. As illustrated in FIG. 7, in an embodiment, a graphical user interface 704 of the mobile device 702 includes two input fields, a password entry field 706 and a password representation field 708. The graphical user interface 704 may be configured such that the password entry field 706 and the password representation field 708 can be populated with values through the receipt of user input, such as through a virtual keyboard application having a keyboard interface 710 or in other ways, such as through a physical keyboard or other user input device. Note that the graphical user interface 704 is illustrative in nature and that numerous variations are considered as being within the scope of the present disclosure. For instance, additional fields may be included, such as a password confirmation field, a username field, and/or others. Also, while techniques of the present disclosure are described with input being provided into a single input device, the techniques of the present disclosure may be applied to input received through multiple input devices. As an illustrative example, a password may be entered using multiple input devices (e.g., some input for the password through one input device and other input for the password through another input device). In some examples, a password is configured such that use of at least two input devices is required to input a correct password and, in some instances, different input devices are components of two separate devices (e.g., a mobile phone and a watch).

As indicated by its name, in an embodiment, the password entry field 706 is used to receive user input that defines a password that is usable as a credential to access to a resource (e.g., data, application functionality, operating system functionality, and the like). A user may, for instance, type his or her password using the virtual keyboard interface 710. The password representation field 708, in this example, is used to receive user input that defines a representation of the password entered into the password entry field 706. Note that, in the example of FIG. 7, the password representation field 708 is configured for defining an alphanumeric sequence. However, the field (or other user interface element) may be configured to define a symbolic representation of a password that comprises non-alphanumeric symbols, images, sounds, vibrations, colors, and/or a combination of alternatives to alphanumeric input.

In an embodiment, an application executing on the mobile device (or another device, such as a server that provided the user interface, for example, in the form of a web page) obtains the entries of the password entry field 706 and the representation field 708 and generates a mapping that is used to display a representation of the password as it is entered, such as in a user interface used for authentication. Note that, by an application performing operations, the computing device executing the application may be executing executable instructions of the application to perform the operations. The mapping may be generated dynamically (e.g., as characters are entered into the password entry field and/or representation field) or in response to received user input that indicates submission of the password/password representation pair, such as user input indicating selection of a "submit" button of the graphical user interface 704. The application may, for instance, map characters of the password to characters of the representation in sequential order. In this example, for instance, "Stasya327" is entered into the password entry field 706 and "ILYA32409" is entered into the password representation field 708. As a result, in this example "S" may get mapped to "I," "t" may get mapped to "L," "a" may get mapped to "Y," "s" may get mapped to "A," and so on.

In some embodiments, the number of characters (or other symbols) in the representation is required to match the number of characters (or other symbols) in the password. In other embodiments, the number of characters (or other symbols) in the representation is required to be at least the number of characters (or other symbols) in the password. In some examples, an application that generates the mapping may apply a set of rules to account for differing sequence lengths between the password and representation. For example, if the representation of the password is longer than the password (e.g., has more members of a sequence,) the individual symbols may be mapped character by character in sequential order, and the last character of the password may be mapped to the terminating subsequence that comprises characters that did not get mapped to other members of the password sequence. In examples in which the length of the representation of the password is shorter than the password, members of the password sequence may be mapped to a space or other character. More generally, in some embodiments, a number of disjoint subsequences of a sequence forming a password is selected and mapped to the same number of disjoint subsequences of the representation of the password and, in some examples, the representation of the password is extended (e.g., with spaces or other characters) so that the representation of the password has at least as many disjoint subsequences as the password. Other techniques may also be used.

Figure 8:
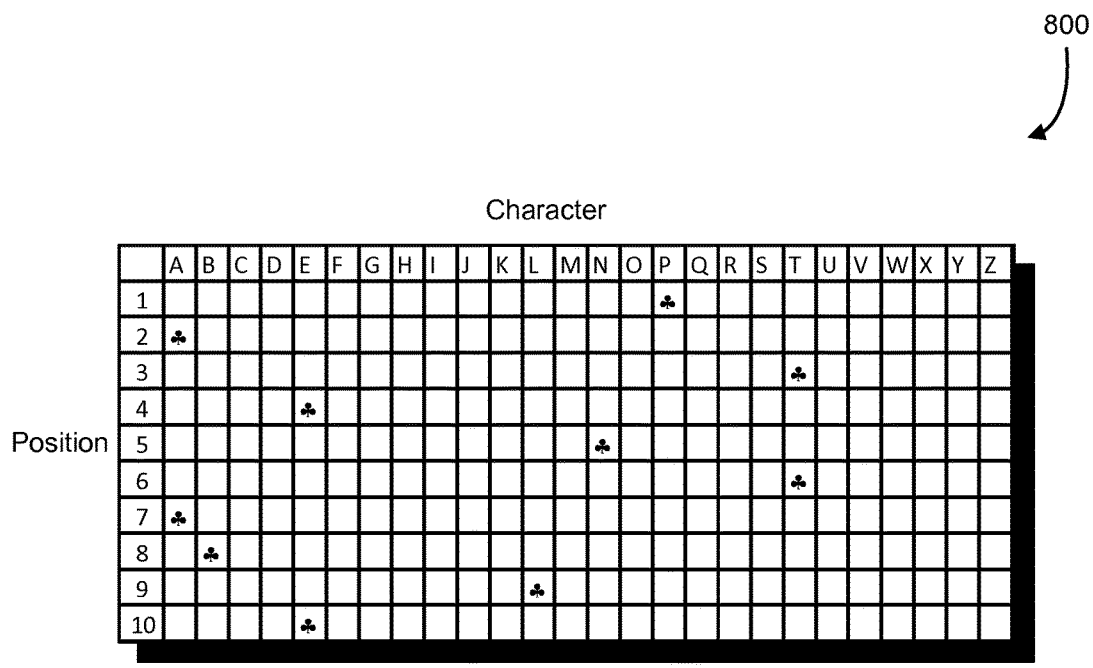
FIG. 8 shows an illustrative example of a mapping in accordance with an embodiment.

In some examples, the representation of a password is a sequence of multiple instances of the same symbol (e.g., character). Symbols not in the password may be mapped to other symbols. In this manner, a sequence of the same symbol indicates (at least with a sufficiently high probability) that the password was entered correctly. Further, in some examples, a mapping may be dependent, at least in part, on positions in a password. For instance, the same symbol of a password may be mapped to different symbols for a password representation depending on what position the symbol occurs in the password. FIG. 8 shows an illustrative example of a data structure 800 that can be used to store an explicit, position-dependent mapping of symbols of a password with symbols of a representation of the password. In this example, the data structure is in the form of a matrix with rows indexed by position in a password and columns indexed by the set of symbols suitable for entry in a password, although different data structures may be used. Note that, while FIG. 8 shows a ten-by-twenty-six matrix for the purpose of illustration, mappings may have different dimensions, such as more possible positions of a password (which may be a number greater than the sequence length of the password) and more possible symbols for entry to a password, such as lowercase letters, numbers, punctuation symbols, and other characters or other symbols.

As illustrated in FIG. 8, an example password is the word "PATENTABLE" and a representation of the password consists of a sequence of club symbols. As illustrated in the mapping, the data structure 800 indicates that, if the first symbol of the password is the letter "P," then the first symbol of the representation of the password is the club symbol. While the entries of the data structure 800 not corresponding to their corresponding symbol in the password are shown as empty, such entries may be populated with other symbols so that, should the user input indicate a symbol at a position in the sequence of the password that is not correct, the data structure 800 can be used to determine what symbol to provide for the password representation. Note, however, that in some embodiments, the entries may remain empty and symbols for the representation may be determined randomly or otherwise, such as described above. In addition, entries in the data structure not corresponding to their corresponding symbol in the password may be populated with the club symbol so that, should an unauthorized entity gain unauthorized access to the data structure 800, the password is more difficult to determine even with access to the password representation. The number of entries populated with the club symbol (generally, with the correct symbol of the representation for the position in the password) may be selected to balance security with the number of false positives (e.g., showing the club symbol when the incorrect symbol of the password has been input).

Turning to this specific example, the first character of the password is "P" and the first row of the data structure, at position "P," records a club symbol and, as a result, the first character of the representation that is provided upon entry of "P" as the first symbol of the password is a club symbol. Had the user input for the first symbol in the password been something different than "P," the mapping would have been used to provide a different symbol for the representation of the password, or a different symbol may have been determined. Similarly, the second row of the data structure 800 corresponds to the second symbol in the password. In this instance, a club appears in the "A" column of the second row of the data structure and, as a result, the second symbol in the representation of the password is a club symbol when "A" is entered as the second symbol of the password. This continues in this manner as the mapping is utilized to update the representation of the password as user input for the password is received.

Figure 9:
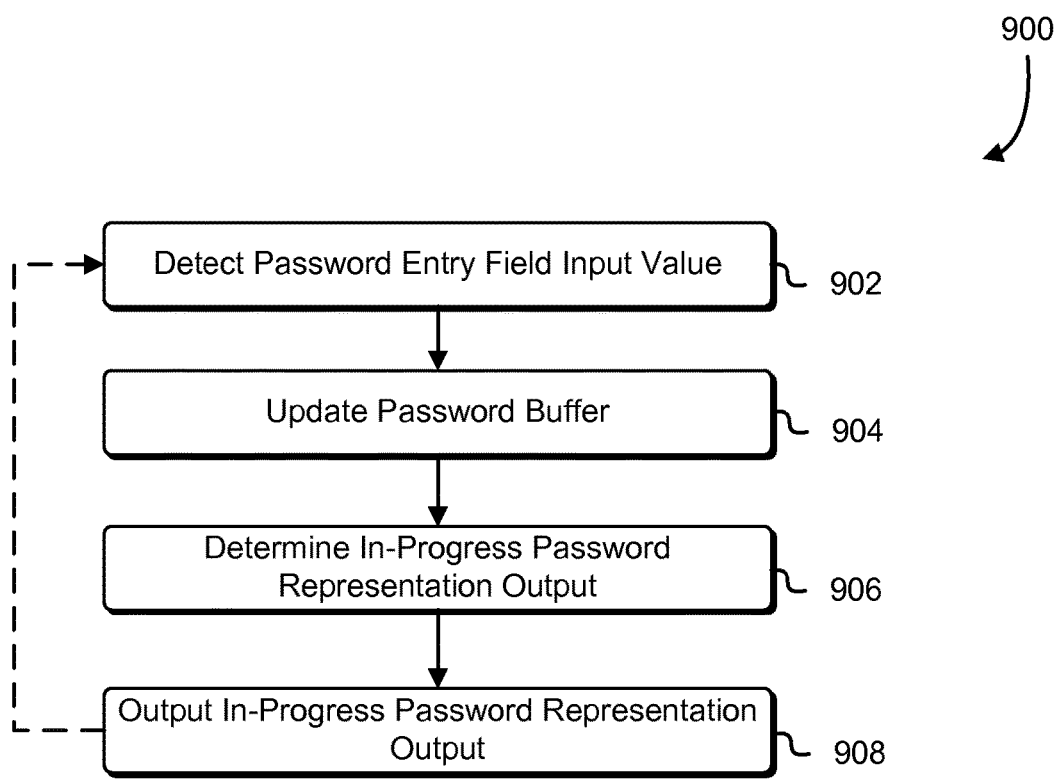
FIG. 9 shows an illustrative example of a process for providing a representation of a state of a password entry field in accordance with an embodiment.

FIG. 9 shows an illustrative example of a process 900 for providing a symbolic representation of a password, in accordance with an embodiment. The process 900 may be performed by any suitable computer system, such as a mobile or other device, such as described above, or by any of the devices enumerated below. As with all processes described herein, the process 900 may be performed under the control of one or more computer systems configured with executable instructions, such as a computing device configured with one or more processors and memory that stores executable instructions that, as a result of being executed by the one or more processors, cause the device to perform operations described in connection with FIG. 9 (or other operations for other processes). In some examples, the process 900 (or other processes described herein) is performed by one or more computing devices that are collectively configured to provide one or more services, where the one or more services perform the operations of the process 900 (or other process).

In an embodiment, the process 900 includes detecting 902 a password entry field input value. The password entry field input value may be detected, for instance, as a result of user input being received by a device performing the process 900. In an embodiment, the password entry field value is a character of a set of characters that can be used as input, although other field values (e.g., images, videos, sounds, motions, etc.) may be used. In other embodiments, the password entry field value is the complete entry into the password entry field (e.g., the sequence of characters that has been entered into the password entry field so far). The detection may be made, for instance, by a sub-process that monitors for changes in the password entry field.

Having detected 902 the password entry field input, a device performing the process 900 updates 904 a password buffer, which may be memory allocated for storage of a password. The contents of the password buffer may be what can be used for a password credential upon indication of submission of the password, such as by receipt of user input indicating selection of a "submit" or other button on a graphical user interface. The way in which the password is used may vary by application. For example, in some contexts, the password itself may be submitted to a module or other computer system that verifies passwords. In other contexts, the password is verified by the application being executed to perform the process 900. In some examples, the password itself is used for verification while, in other contexts, the password is input into a hash or other function to generate a value that is used to verify the password. The password buffer may be updated 904 in accordance with the detected 902 password entry field input value, such as by storing the state of the password entry field as determined from detecting 902 the password entry field input value.

As illustrated in FIG. 9, the processes 900 may also include determining 906 an in-progress password representation output, which may be a symbolic representation of the state of the password entry field. To determine 906 the in-progress password representation output, a device performing the process 900 may utilize a mapping, such as described above, where the mapping may comprise an explicit mapping portion and/or an implicit mapping portion. The specific manner in which the in-progress password representation output depends on the various techniques used to map password input to password representation output. Note that, while FIG. 9 shows updating 904 the password buffer and determining 906 the in-progress password representation output as being performed in sequence in a particular order, the order may be reversed or the operations may be performed in parallel.

Once the in-progress password representation output has been determined 906, the device performing the process 900 may output 908 the determined in-progress password representation output. Outputting 908 the determined in-progress password representation output may be performed, for instance, by updating a display to show the in-progress password representation output or in other ways, such as by utilizing an appropriate output device (e.g., speaker, vibration generator, etc.) for the output. Example ways in which in-progress password representation output can be displayed or otherwise provided are discussed above and below.

Figure 10:
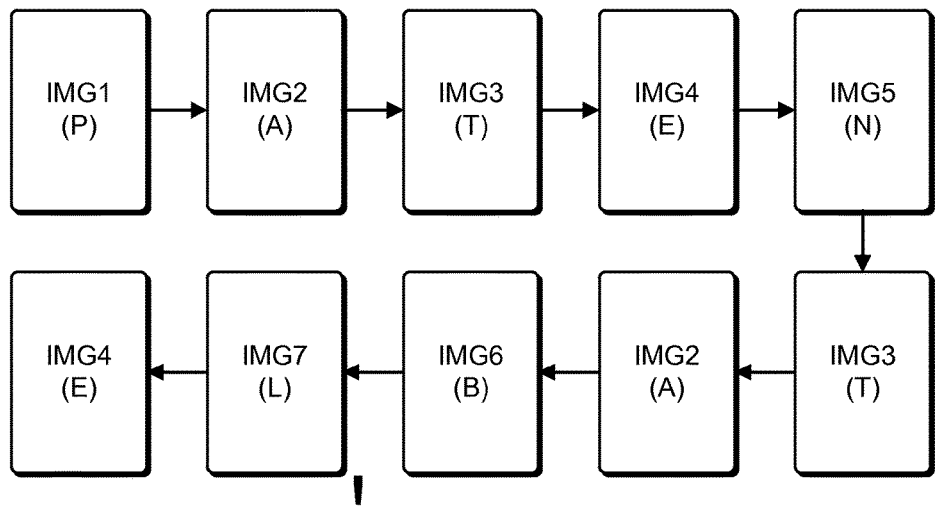
FIG. 10 shows another illustrative example of how a mapping may be applied as user input is received, in accordance with an embodiment.
Figure 10:
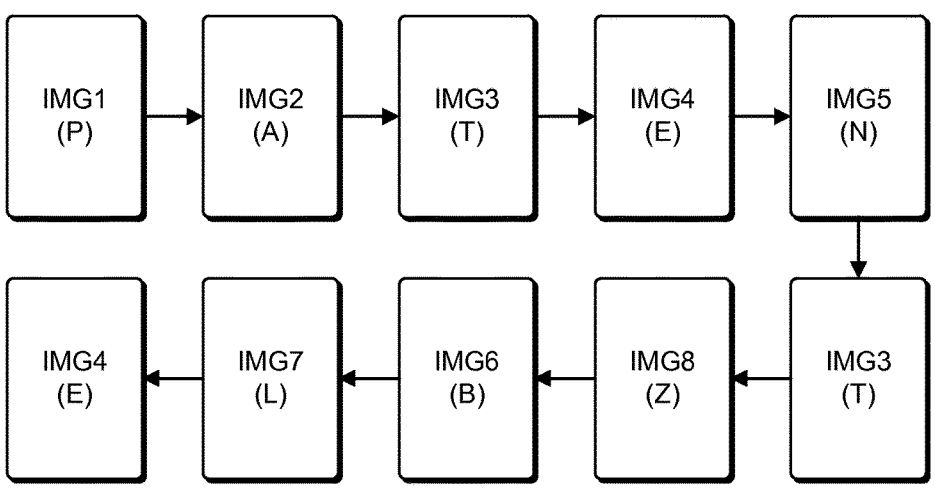

As noted, different techniques may be used to symbolically represent passwords and other items for which symbolic representations may be applicable. FIG. 10 shows a diagram 1000 illustrating how non-alphanumeric symbols may be used in a symbolic representation of a password. As illustrated in FIG. 10, a password of "PATENTABLE" comprises a sequence of characters that are mapped in sequence to images, which may be stored electronically in the form of image files. A mapping may specify correspondences between characters and images using, for instance, identifiers of the images, such as file names. Note that, while FIG. 10 shows a mapping that is independent of sequence position (e.g., "A" maps to "IMG2" regardless of the position of "A" in the sequence that was entered.) Note, however, that a position-dependent mapping may also be used, such as described in connection with FIG. 8. In this example, each distinct character of the password is mapped to a different image file and the mapping may other characters to other image files.

In FIG. 8, the arrows between images (labeled with IMG#, where # varies among the different images) indicate the sequence in which corresponding characters of the password are defined by user input that is received. In the upper half of the figure, the input that is received is for the correct password "PATENTABLE," whereas in the bottom half of the figure, the input for the password is incorrect (i.e., the input is "PATENTZBLE" instead of "PATENTABLE"). As a result, because of the mapping, when the correct password is input, the sequence of images that appear in the display is as follows: IMG1; IMG2; IMG3; IMG4; IMG5; IMG3; IMG2; IMG6; IMG7; IMG4. However, when the incorrect password "PATENTZBLE" is entered," the sequence of images that appear in the display is IMG1; IMG2; IMG3; IMG4; IMG5; IMG3; IMG8; IMG6; IMG7; IMG4. Thus, display of IMG8 as the seventh item in the sequence of the symbolic representation of the password instead of IMG2 serves as an indicator that the seventh character of the password was entered incorrectly. A user may, therefore, know where the error i|s and correct the error. For example, in some embodiment, the user may select IMG7 on a graphical user interface, select "delete" on a virtual keyboard, and type in the correct character. The application may then update the password in memory accordingly. In another example, another symbolic representation of the password (e.g., a sequence of dots or asterisks) may be edited to edit the corresponding password in memory.

Note that the sequence of images can be provided in various ways in accordance with various embodiments. In some examples, images replace one another as password characters are entered for the password and the image shown on the display is the last character entered. If a sequence is pasted using a paste operation, the image corresponding to the last character in the sequence may be displayed, and the images of the pasted sequence may be shown in sequential order (according to the sequence of characters). In other examples, as characters are entered for the password, a sequence of corresponding images is shown on the display, e.g., in a line or to fill a two-dimensional grid. Instead of images replacing one another, additional images are added to the display as the corresponding password characters are entered. If a sequence of characters of the password is entered, the corresponding images may be added to the display in sequential order so that they are all displayed at once. Additional graphical user interface techniques may also be utilized, such as by making a graphical user interface that allows for scrolling through or otherwise navigating through the images.

The images in the example of FIG. 10 and variations thereof and the images for the mapping may be obtained in various ways in accordance with various embodiments. In some examples, the images are selected from a set of stock images. In other examples, the images are selected from images that are available to the mobile device, such as images the mobile device has captured itself or otherwise stores. Images may also be selected via user input from locations over a network, such as via a social networking application. In other examples, an automated process selects images without user input specifying the exact mapping. For example, a set of stock images (i.e., images not specific to an account associated with a user of the device employing techniques discussed in connection with FIG. 10) may be utilized for characters not in the password and images captured by the device (or available through an account of a service accessed through the device) may be used for characters that are in the password. In this manner, the existence of an image that the user does not recognize (e.g., from the stock images) serves as an indicator of an error in password entry. In some examples, the mapping is static and set for later use. In other examples, the mapping is dynamic such that, for example, an image is randomly selected from one set of images when the character is one of the password and from another set of images when the character is not part of the password. Generally, while many of the above techniques describe character-to-character or, more generally, sequence-to-sequence mappings, mappings may be set-to-set such that, for example, if a member of one set is entered into a password entry field, a member of the mapped set is used for a symbolic representation of the member that was entered. One or both sets may have multiple members.

As noted above, other types of symbolic feedback may be provided in addition to or instead of those examples described above. For instance, in some embodiments, symbolic feedback is provided using previous transactions, which may be stored locally or on a server. Characters of a password (or components of other input) may be mapped to financial transactions or characteristics thereof (e.g., items purchased, dollar amounts of recent purchases). The sequence in which transactions are displayed or otherwise provided may indicate whether the input has been made correctly. Random items or other information may be used when a character or other input does not map to a transaction the user has engaged in or a characteristic thereof (e.g., to an item the user has purchased).

Figure 11:
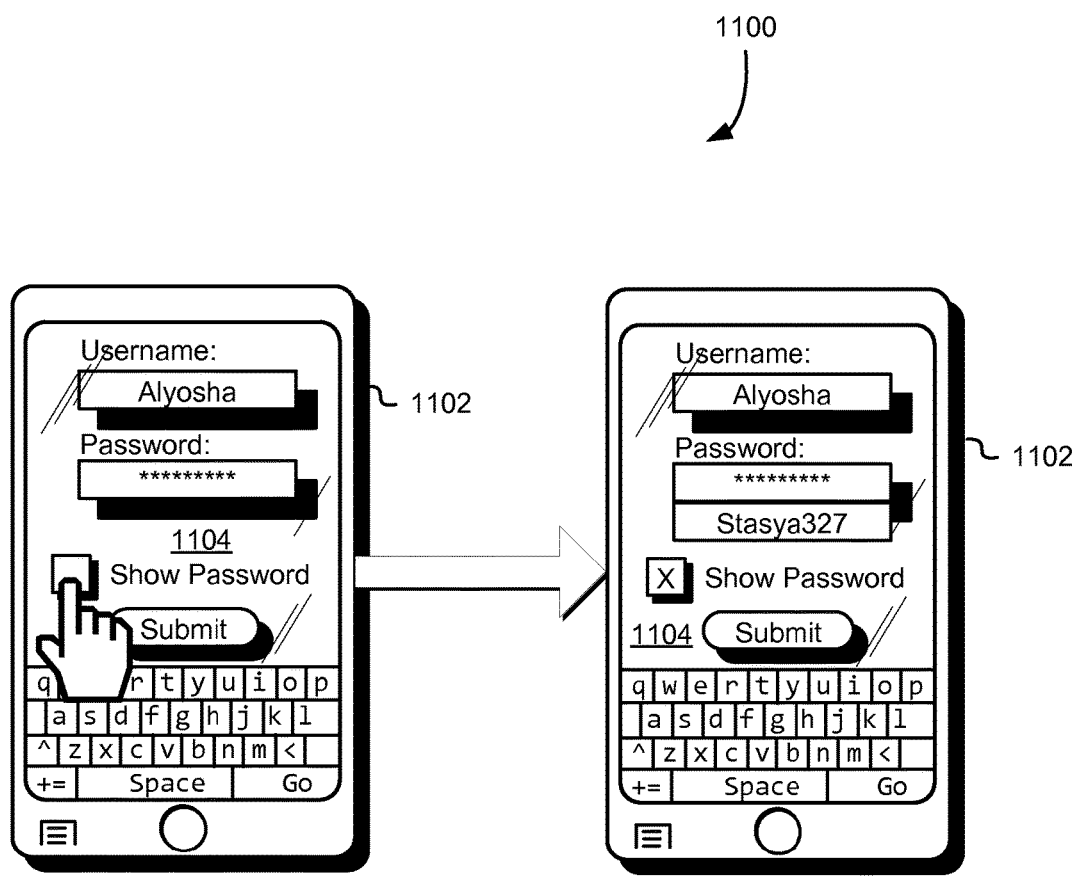
FIG. 11 shows an illustrative example of a technique for mirroring contents of a password entry field in accordance with an embodiment.

Techniques of the present disclosure also allow for other ways in which feedback regarding entry of input for a password (or for another purpose) can be provided to users. FIG. 11 shows a diagram 1100 illustrating one such technique in accordance with an embodiment. In FIG. 11, a mobile device 1102 has a graphical user interface 1104, such as described above. While FIG. 1 is illustrative in nature, as with all techniques illustrated herein, variations are considered as being within the scope of the present disclosure, such as variations in the type of input that can be provided (audio (through a microphone, e.g.), visual (through a camera, e.g.), tactile (using touch sensors), movement-based (e.g., using an accelerometer or other sensor)), or otherwise.

As with other examples illustrated herein, the user interface 1104 includes a username field and a password entry field. As with many conventional password entry fields, input into the password entry field is obscured (e.g., by symbolically representing the characters entered for the password as a sequence of asterisks, one per character of the password that has been entered). In this example, however, there is an element in the user interface 1104 that, when selected, causes the characters that have been entered for the password to be displayed in a password display field. In this example, the element is a checkbox that, when selected (e.g., by user input to a touchscreen of the mobile device 1102), causes the password characters that have been entered to be displayed in a password display field. Other user interface elements may also be used, such as radio buttons, other buttons and, generally, user interface elements that can be selected to cause the characters of the password that have been entered to be shown.

The manner in which the password is shown may be in accordance with the process 1200 described below in connection with FIG. 12. In the example of FIG. 11, the actual password that has been entered (or the portion of the password that has been entered) is shown when the corresponding user interface element is selected (as indicated on the right side of the figure. However, techniques such as those described above where there mappings are utilized may be utilized to determine what is shown on the display of the mobile device 1102. For example, instead of or in addition to showing the actual portion of the password that has been entered, the user interface may display a symbolic representation of the portion of the password that has been entered that is different from the portion of the password that has been entered.

Figure 12:
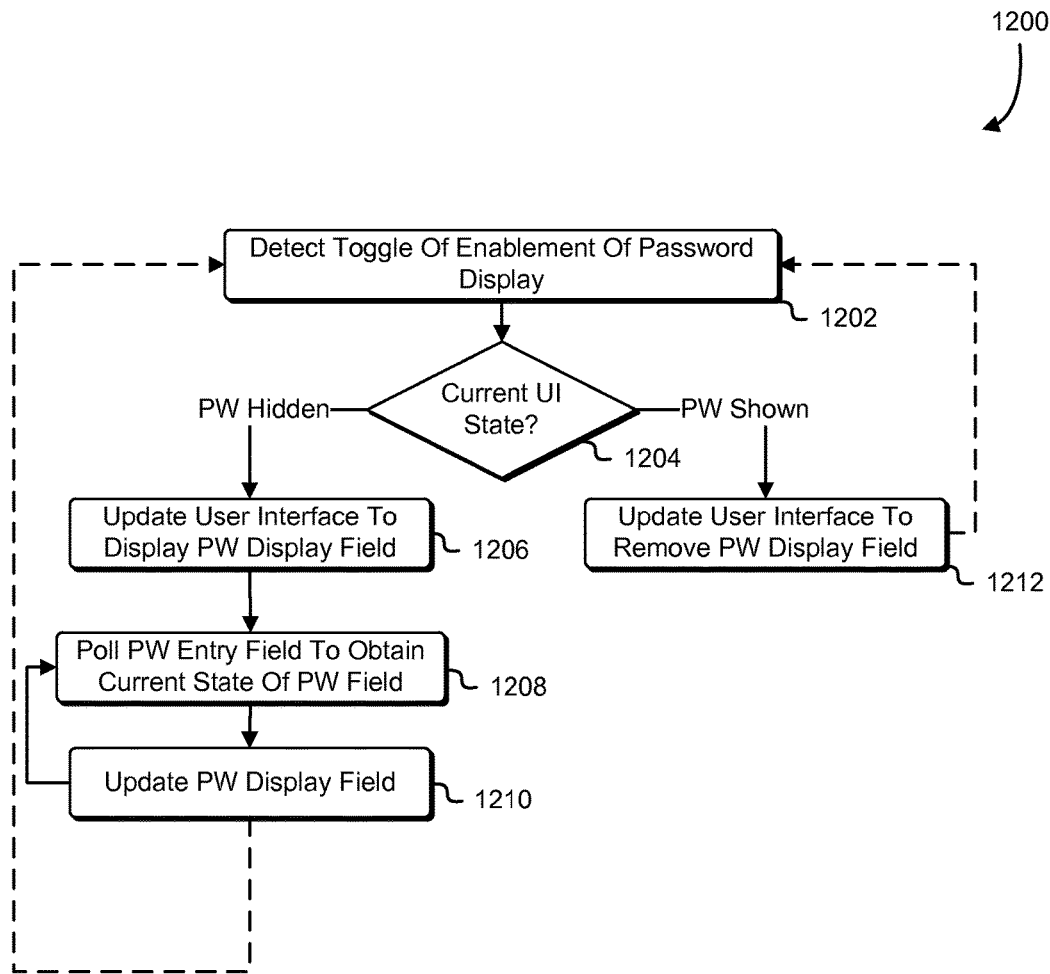
FIG. 12 shows an illustrative example of a process for mirroring contents of a password entry field in accordance with an embodiment.

FIG. 12 shows an illustrative example of a process 1200 for updating a user interface, such as a graphical user interface as described above. The process 1200 may be performed by any suitable computer system, such as a mobile device described above or another computer system, such as those noted above and below. In an embodiment, the process 1200 includes detecting a toggle of enablement of password display. For example, a mobile device may detect selection of the "Show Password" checkbox in the graphical user interface shown in FIG. 11. Generally, the process 1200 may include any detection of user input indicating that the password should be shown.

Figure 13:
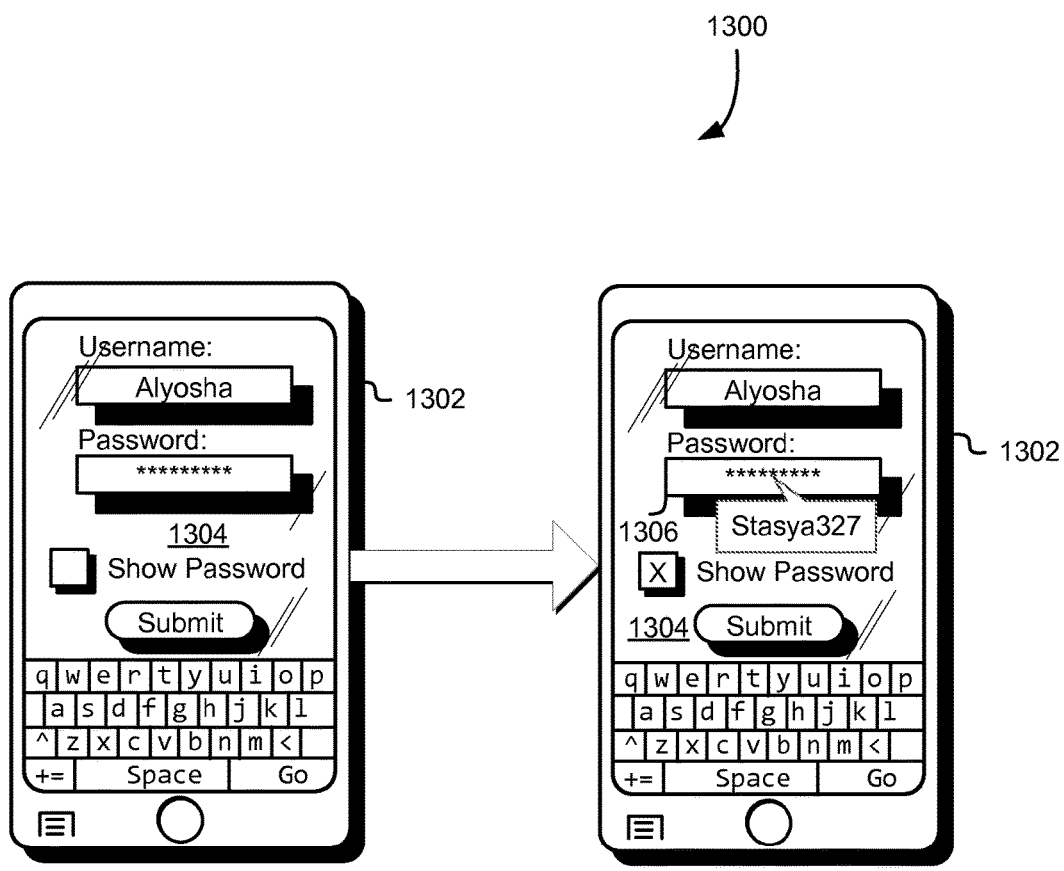
FIG. 13 shows another illustrative example of a technique for mirroring contents of a password entry field in accordance with an embodiment.
Figure 14:
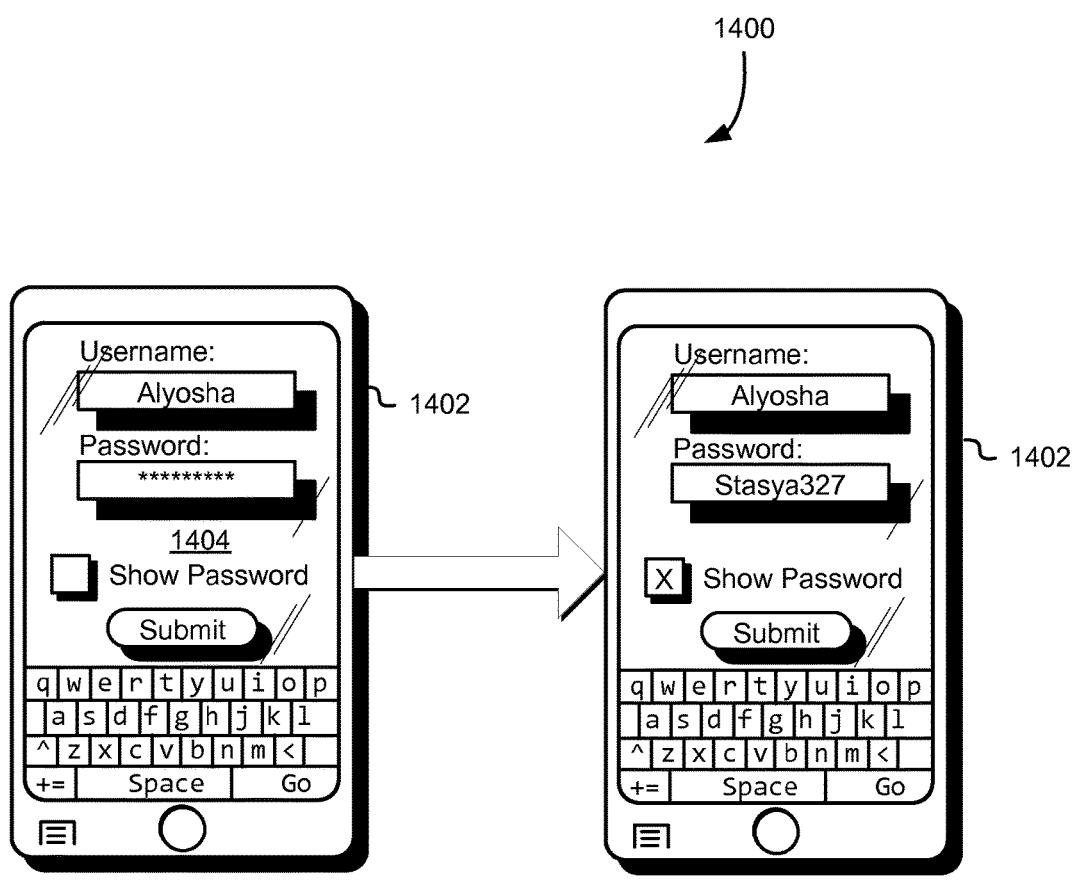
FIG. 14 shows another illustrative example of a technique for mirroring contents of a password entry field in accordance with an embodiment.

As a result of detecting 1202 enablement of the password display, the process 1200 may include determining 1204 the current state of the user interface and, specifically, whether the password is currently hidden or shown. A state machine or other mechanism may be used to track the state of the user interface. If determined 1204 that the current state of the user interface has the password hidden, the device performing the process 1200 may update 1206 the user interface to display a password display field, which may be a separate field that the user interface uses to display the contents of memory for the portion of the password that has been entered. The password display field may be configured in various ways in various embodiments, such as by supplementing a password entry field that obscures input that has been entered into the field, or by overlaying the password entry field. Example password display fields are shown in FIGS. 11, 13, and 14. A locally executing application may be programmed to update the user interface to provide the password display field or the user interface may be updated in other ways, such as by transmitting an update to the user interface over a network, such as by providing an updated webpage or component thereof.

The process 1200 also includes polling 1208 the password entry field to determine the state of a password that has been entered into the password entry field. Polling 1208 the password entry field may be performed, such as by obtaining the value of a variable used to store the state of the password entry field, submitting a query to obtain the current state of the password entry field, or otherwise. Note that, while polling the password entry field is shown for the purpose of illustration, the state of the password entry field may be obtained in other ways, such as by subscribing to an event that is published as a result of the password entry field being updated, querying another field or, generally, the state of a variable that depends on the state of the password entry field or, generally, any way by which the state of the password entry field can be obtained. Once the current state of the password entry field has been determined by polling 1208 or otherwise obtaining the state of the password entry field, the password display field may be updated 1210 to display the current state of the password entry field. In this manner, the state of the password that has been entered through user input is entered into one field, but displayed in another, thereby preventing a keyboard application from storing the password in a dictionary or otherwise.

The password entry field may be polled 1208 and the password display field may be updated 1210 with results of the polling repeatedly until something causes the process 1200 to end or pause, such as submission of the password stored in memory for authentication, navigation away from a screen that displays the password display field, or otherwise.

The frequency at which the password display field is updated (or, the frequency at which the password entry field is polled or at which the state of the password entry field is otherwise obtained) may be such that updates to the password display field are, to a human user, immediate as input is provided to the password entry field, but not so frequent that the polling an update consumes resources that perceptibly affect operation of the device performing the process 1200. The frequency may be, for instance, several tens or hundred times per second. In some examples, the frequency at which the password entry field is polled or at which the state of the password entry field is otherwise obtained is dynamic. For example, an application may be configured such that polling is more frequent when user input is concurrently being received for the password entry field and less frequent otherwise. In another example, a user interface may have other fields and the frequency may depend on whether a cursor is present in the password entry field or whether the last field that has been selected for input is the password entry field. The frequency may be higher when the cursor is in the password entry field or the password entry field is the last field that has been selected for the receipt of user input.

Note that, in some embodiments, the state of the password entry field is obtained and used to update the password display field regardless of the state of the password entry field the last time the password entry field was changed and/or regardless of what the state of the password display field is relative to the last time the password filed was polled. Thus, if the password entry field has not changed from one polling to the next, the value in the password display field is simply replaced with the same value which, to a human user, may appear as no change to the password display field. In an alternate embodiment, before updating the password display field, the process 1200 includes determining whether the password in the password entry field has changed relative to the last (or, generally, a previous) polling of the password entry field, and the password display field is only updated as a result of a detected change in the password entry field.

As illustrated in FIG. 12, if determined 1204 that the current state of the user input has the password shown (e.g., in a password display field), the process 1200 may include updating 1212 the user interface to remove the password display field. In this manner, if user input indicates a desire to not display the state of the password entry field, the password display field is removed from the user interface, thereby preventing the password from being shown in the password entry field.

As shown by the broken arrows in FIG. 12, after the user interface is updated to display the current state of the password entry field in the password display field or after removing the password display field from the user interface, the process 1200 may repeat if/when user input indicating a toggle between showing the password and not showing the password is detected 1202.

In some embodiments, the process 1200 is modified to utilize techniques for replacing a password with a symbolic representation of the password. For example, before updating the password display field, a mapping may be applied to the input that has been received into the password entry field or to a changed portion of the password entry field since last polling to determine a symbolic representation of the password, such as utilizing the various techniques described herein. In this manner, the password is not displayed, and the keyboard application is prevented from storing the symbolic representation of the password. In some examples, the user interface is configured with a user interface element that allows users, through user input, to specify whether to display either the password or a symbolic representation of the password or, in some example implementations, nether.

FIG. 13 shows a diagram 1300 illustrating one such technique in accordance with an embodiment. In FIG. 13, a mobile device 1302 has a graphical user interface 1304, such as described above. As with other examples illustrated herein, such as in FIG. 13, the user interface 1304 includes a username field and a password entry field, where the state of the password entry field is obscured, such as described above. As with FIG. 11, in the user interface 1304 there is an element in the user interface 1304 that, when selected, causes the characters that have been entered for the password to be displayed in a password display field. In this example, the element is a checkbox that, when selected (e.g., by user input to a touchscreen of the mobile device 1302), causes the password characters that have been entered to be displayed, although other user interface elements may be used.

In the example of FIG. 13, selection of the checkbox triggers the appearance of a password display field which, in this example, is in the form of a box with a callout pointing to the password entry field. Similarly, user input for deselection of the checkbox causes the password display field to disappear from the display. As with FIG. 1, in this example, the input that has been entered for the password is "Stasya327." When the state of the user interface 1304 is such that the password is shown in the password display field, the password may be updated in accordance with changes to the password entry field, such as utilizing the various techniques discussed herein.

FIG. 14 shows a diagram 1400 illustrating one such technique in accordance with an embodiment. In FIG. 14, a mobile device 1402 has a graphical user interface 1404, such as described above. As with other examples illustrated herein, such as in FIG. 14, the user interface 1404 includes a username field and a password entry field, where the state of the password entry field is obscured, such as described above. As with FIG. 11, in the user interface 1404 there is an element in the user interface 1404 that, when selected, causes the characters that have been entered for the password to be entered. In this example, the password display field is superimposed on top of the password entry field, giving the effect that the sequence of characters that has been entered for the password is shown in the password itself. Other techniques for producing this effect may also be used, and the particular technique that is employed may depend on the particular functionality of the underlying operating system executing on the mobile device 1402.

In an embodiment, as with other techniques described herein, the user interface 1404 is configured to operate to give the appearance that user input edits the state of the password display field. In one example, the password display field includes a cursor or other indicator of position within the field. The cursor position may be obtained when polling the password entry field (if that technique is used to achieve the effect of FIG. 14) or otherwise (e.g., through maintenance of a state machine for the cursor that updates the tracked position of the cursor in accordance with user input that is received for the password display field). The position obtained may be used to cause the cursor in the password display field to mimic a cursor in the password entry field. For instance, if user input to enter a character into the password is received, the password entry field cursor may advance one position (to indicate a position for entry of the next character) and the password display field cursor may advance accordingly.

In addition, in various examples, the cursor position in the password entry field may be manipulated through the password display field. As an illustrative example, a user may notice an error in the $n^{th}$ character of the password, where the number of characters that have been entered for the password is greater than n (n being a positive integer). The user may then provide user input to the password display field to change the position of the cursor, such as by touching a touchscreen in the approximate location that the user desires the cursor to be. The user may, for instance, touch the touchscreen to reposition the cursor to be immediately before or after the n$^{th}$ character displayed in the password display field. This user input may be translated to user input to the password entry field. For instance, the user input may be translated to user input that would occur had the user touched the touchscreen at the same position (in terms of the sequence of characters) as with the password display field. Focus of the user interface 1404 may also be transferred to the password entry field. Such translation may involve a translation of coordinates (e.g., by way of a Euclidean translation) if, for example, the password display field is a different size than the password display field and/or is in a different position than the password display field. With focus transferred to the password entry field, alphanumeric character (or other) entry (e.g., to delete and replace the n$^{th}$ character) is then provided into the password entry field and then mirrored into the password display field, such as described above. Such techniques may also be adapted to provide advanced functionality. For example, by translating user input to the password display field into the password entry field, other states of the password entry field may be reflected into the password display field. For instance, the above technique for translating user input to the password entry field can cause some or all of the password to be highlighted, and such highlighting may be mirrored into the password display field to give the visual impression that the user has highlighted the content of the password display field.

Figure 15:
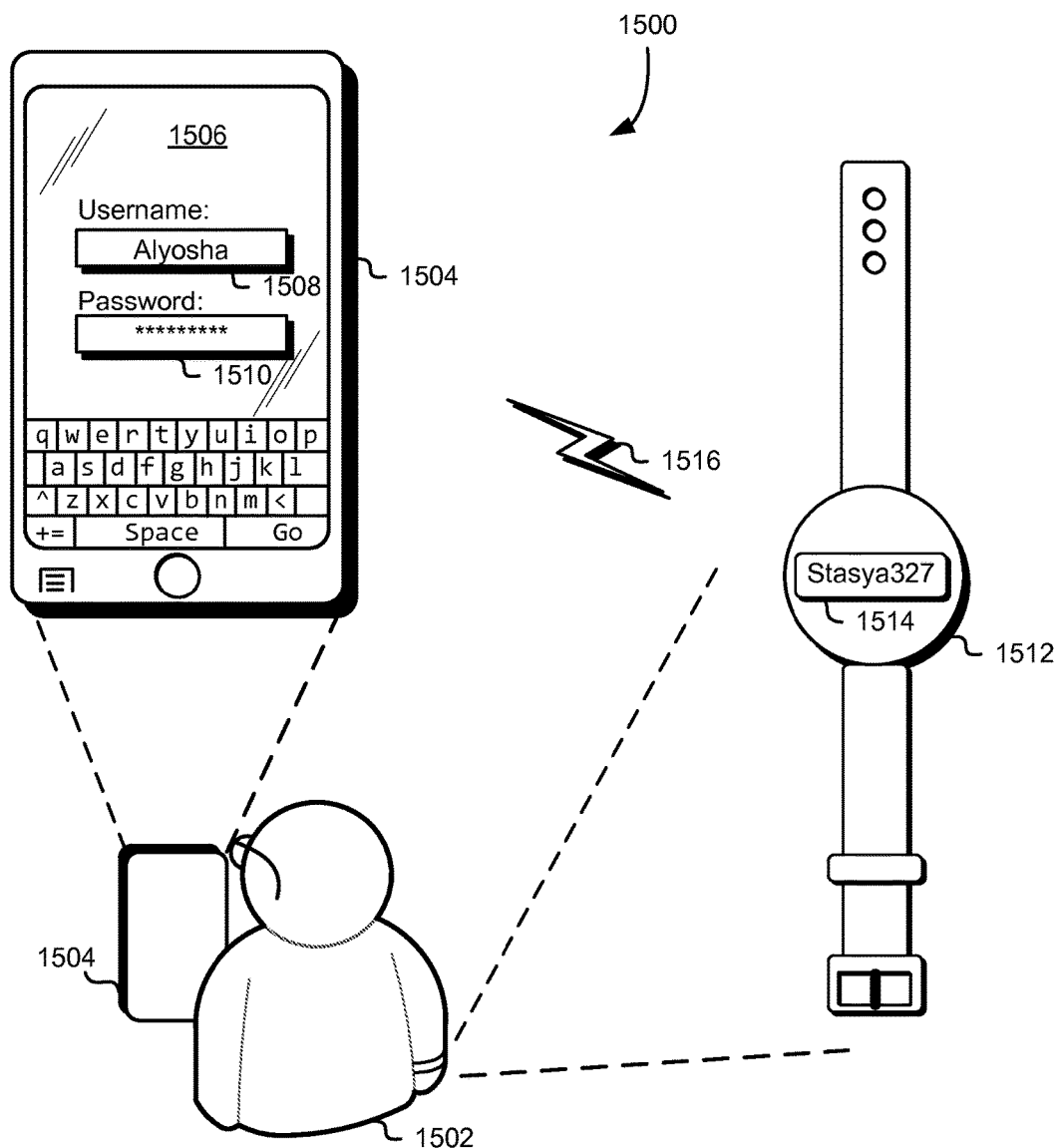
FIG. 15 shows an illustrative example of a technique for mirroring contents of a password entry field to another device in accordance with an embodiment.

As noted above, numerous variations in which inputs for a password or other information are considered as being within the scope of the present disclosure. In some examples, the techniques described herein involve multiple devices. For example, input received into one device may be reflected and/or symbolically represented by another device. FIG. 15 shows a diagram 1500 illustrating example ways in which multiple devices may be used to employ various techniques described herein.

As shown in FIG. 15, a user 1502 utilizes a mobile device 1504, such as described above. The mobile device 1504 may execute an operating system or other application that has a graphical user interface 1506 that, in this example, includes a username field 1508 and a password entry field 1510, such as described above. In this example, the user 1502 utilizes another device 1512 which, in this example, is a watch with computational resources (e.g., one or more processors, memory, a network interface, and the like) that enable the watch to perform communication and processing operations, such as to participate in utilization of various techniques described herein. The watch 1512 is an example of a wearable computing device, although other types of devices may be utilized instead of or in addition to the watch 1512. Such devices include, but are not limited to, those devices described above and below, and may include other types of devices, such as eye glasses with an embedded display and computational resources and, generally, any hardware configured (e.g., with specialized hardware and/or programmed with software) to perform operations described herein. In another example, the output is transmitted to headphones via a wired connection (e.g., through a signal transmitted through a headphone jack) or a short-range communication channel (e.g., Bluetooth). In this example, as with tactile vibrational output (e.g., output that causes a vibration of a device that can be felt by humans), the output is non-visual (i.e., comprises non-visual content). In some examples, a limited-input device may have a display that provides the symbolic feedback using a short range communication channel. Example devices include devices with a single button (generally, devices that lack a physical or virtual QWERTY keyboard) that can be pressed to place an order for a good associated with the device (e.g., laundry detergent). Such devices may have a display or other mechanism for providing feedback (e.g., LED flashes, sound, LCD screen, etc.). For instance, such limited-input devices may be distributed throughout a home and many (e.g., those within communication range and/or connected to a wireless router) may display symbolic feedback and a user may look at the most convenient (e.g., nearest) such device.

As illustrated in FIG. 15, user input from the user 1502 may be received into an input device of the mobile device, such as a touchscreen via a virtual keyboard application. In this example, the input that is received is obscured by way of the password entry field 1510 showing a sequence of asterisks, with one asterisk per character of the password that has been entered into the field 1510. Also as illustrated in FIG. 15, the watch 1512 includes a password display field 1514 that, in accordance with adaptations of techniques described above, displays the state of the password that has been entered into the password entry field 1510 or a symbolic representation thereof.

To obtain data to determine what to display in the password display field 1514, the watch 1512 may communicate with the mobile device 1504 over a communication channel 1516. In some examples, the watch 1512 and the mobile device 1504 communicate via a short-range communication channel. The short-range communication channel may be established using various technologies, such as induction wireless, infrared wireless (such as technologies operating according to specifications and protocols provided by the Infrared Data Association, or IrDA), or ultra wideband formats. In some embodiments, the first and second devices may utilize short-range, low-power and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and a microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data), or magnetic field-based transfer (e.g., reading data from a magnetic stripe) may be used for inter-device communication. The protocols and components for enabling computing devices to perform the systems and methods of the present disclosure using such means for inter-device communication are well-known to those skilled in the art of computer communications and thus need not be described in more detail herein. Generally, embodiments described herein are not limited to those explicitly illustrated herein. In other examples, the watch 1512 and the mobile device 1504 communicate over another communication channel, such as over a network such as the Internet or, generally, through an intermediate device, such as a wireless router.

In some examples, the mobile device 1504 (in accordance with executable instructions that one or more processors of the mobile device executes) applies a mapping to input received into the password entry field 1510 and sends a result of the mapping to the watch 1512 for display thereon. The watch may receive the result from the mobile device 1504 and display the result accordingly. In other examples, the state of the password entry field is transmitted to the watch 1512 by the mobile device 1504, and the watch 1512 applies a mapping. In this example (and, generally, in other examples), the communication channel between the watch 1512 and the mobile device 1504 may be encrypted. In yet other examples, the mobile device 1504 applies a mapping and transmits the result to the watch 1512, which applies another mapping (or the same mapping) to the result. In this example, two mappings may be considered collectively as a composite mapping. Note that, when the state of the password entry field is transmitted to the watch 1512 (or other device), the state may be transmitted such that the watch 1512 can detect the state of the password entry field and update a display or other output accordingly. For example, the state of the password entry field may be transmitted with metadata that identifies that the corresponding data encodes the state of the password entry field.

Further, in some examples, the mobile device polls the password entry field 1510 and, as a result of a change to the state of the password entry field (i.e., a change to the data that has been entered into the password entry field), the mobile device 1504 transmits a notification of the change to the watch 1512. In other examples, the watch 1512 polls the mobile device 1504 for the state of the password entry field and/or for a state of the symbolic representation.

Note that, as with other techniques described herein, different types of symbolic feedback may be provided via the watch and/or the mobile device 1504. For example, in some embodiments, the watch 1512 may display a symbolic representation of the input that has been provided to the password entry field, while the mobile device may display the input that has been provided to the password entry field, or vice versa. In other words, the various techniques described herein may be combined and adapted for different contexts. As another example, the password may be input into a user interface of the watch 1512, and the mobile device may display the symbolic representation of the password. As noted above, other types of symbolic feedback may be provided, such as through sounds, vibrations, displays on a display device of eyeglasses, and/or other ways in which output may be output by a device.

Other variations of that which is discussed in connection with FIG. 15 and other figures are also considered as being within the scope of the present disclosure. For example, in some embodiments, a mobile or other device a computing device with integrated, yet distinct, circuitry that generates one-time passwords. The special-purpose circuitry may display one-time passwords upon a single display that is shared with general-purpose circuitry. For example, the mobile device may render a user interface upon a touchscreen through which the user is to input the one-time password. Upon pressing a button or another trigger, the special-purpose circuitry causes the one-time password to be shown upon the touchscreen. The general-purpose circuitry cannot read the one-time password from the special-purpose circuitry. In this example, both the special-purpose circuitry and the general-purpose circuitry may be configured with a mapping that is applied to one-time passwords. When the special-purpose circuitry displays a one-time password on the display, it may also utilize the mapping to display a representation of the one-time password (e.g., using a mapping that maps a sequence of one-time password characters to shorter sequence, such as sequence of words from a dictionary (of a spoken language) and/or to a sequence of images). As the user enters the one-time password into the touchscreen, the device may apply its copy of the mapping and the display accordingly. The user can verify that input of the one-time password is correct by comparing the representation provided by the special-circuitry with the representation provided by the general-purpose circuitry, where the representations may be simpler than the one-time passwords to which they correspond. Example techniques that may be utilized to achieve such embodiments are described in U.S. patent application Ser. No. 14/572,739, filed on Dec. 16, 2014 and titled "Computing Device With Integrated Authentication Token," which is incorporated herein by reference.

Figure 16:
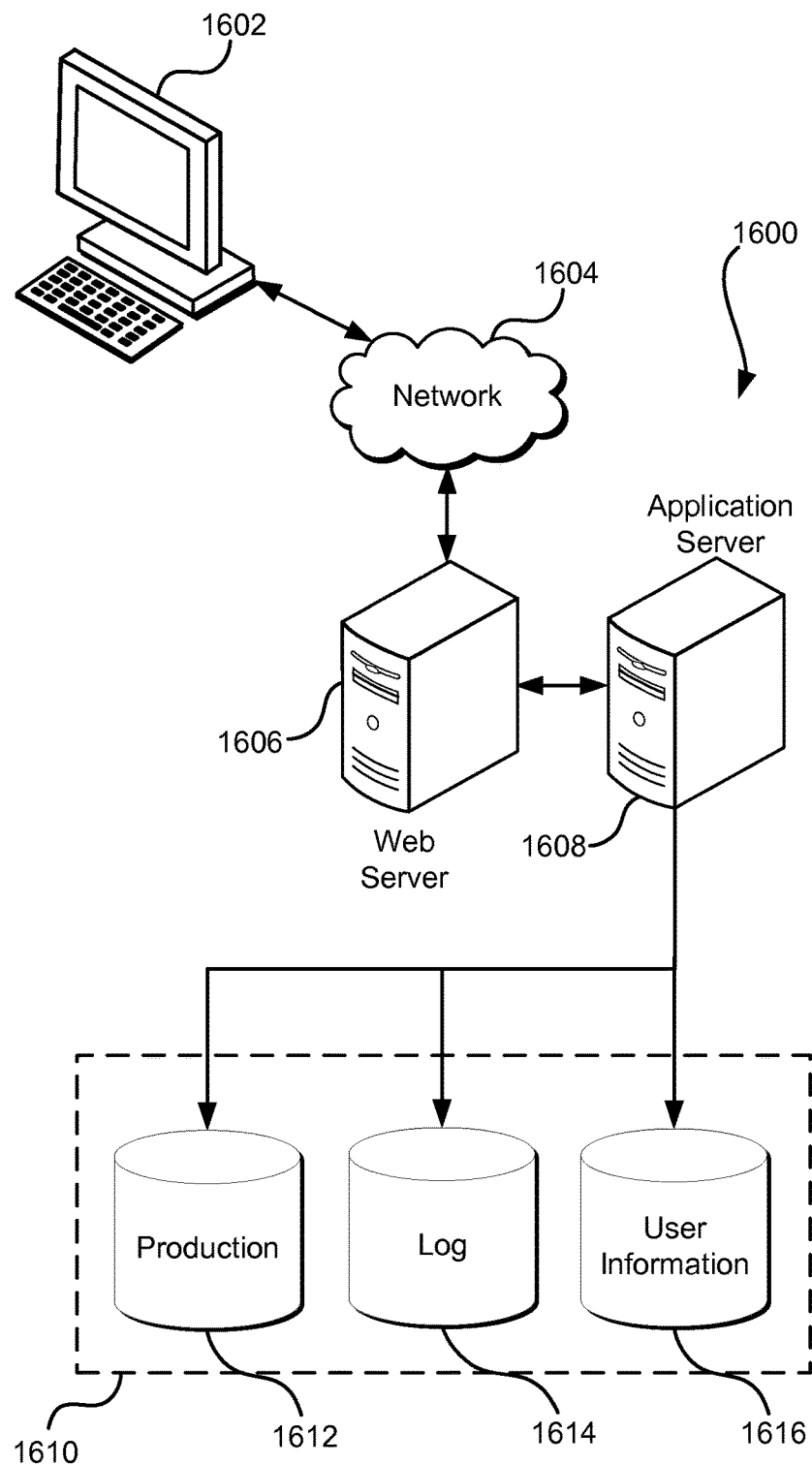
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1602 and the application server 1608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. The application server 1608 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, as a result of being executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Embodiments of the present disclosure can be described in view of the following clauses:

1. A computer-implemented method, comprising:
providing a graphical user interface that utilizes a password entry field to control access to a resource;
receiving, from an input device of a computer system, input defining a sequence of characters for the password entry field of the graphical user interface;
applying a mapping to the sequence of characters to determine a representation of the password, the sequence having a length and the mapping being configured such that a different sequence of the same length results in a different representation; and
updating the graphical user interface to display the representation of the password without displaying the sequence of characters.

2. The computer-implemented method of clause 1, wherein:
the mapping maps individual characters to other individual characters; and
the representation of the password comprises another sequence of characters.

3. The computer-implemented method of clause 1 or 2, wherein the method further comprises:
receiving, via the input device, other input that defines at least a portion of the mapping; and
generating the mapping based at least in part on the other input.

4. The computer-implemented method of any of clauses 1-3, wherein the representation of the password comprises non-alphanumeric content determined based at least in part on the mapping.

5. A system, comprising:
one or more processors; and
memory storing instructions that, as a result of being executed by the one or more processors, cause the system to:
    obtain a result of input received into a user interface via one or more input devices, the result comprising multiple components;
    apply a mapping to the result to determine a representation of the result that is different than the result, the mapping configured such that application of the mapping to different same-size sets of components results in different representations; and
    provide the representation of the result.

6. The system of clause 5, wherein the instructions that cause the system to provide the representation of the result, as a result of being executed by the one or more processors, cause the system to update the user interface to present the representation of the result.

7. The system of clause 5 or 6, wherein the instructions that cause the system to provide the representation of the result, as a result of being executed by the one or more processors, cause the system to transmit the representation of the result to a wearable computing device.

8. The system of any of clauses 5-7, wherein the instructions, as a result of being executed by the one or more processors, further cause the system to, as a result of receipt of an update to the input, update the representation of the result, resulting in an updated representation of the result and provide the updated representation.

9. The system of any of clauses 5-8, wherein:
the multiple components comprises a sequence of characters; and the representation of the result comprises at least one image selected from a set of images.

10. The system of any of clauses 5-9, wherein the input is received into a password entry field of the user interface and the multiple components are a sequence of characters entered into the password entry field.

11. The system of any of clauses 5-10, wherein the representation of the result comprises a sequence of items, the sequence of items comprising individual items that are mapped, by the mapping, to respective components of the multiple components.

12. The system of any of clauses 5-11, wherein:
the multiple components comprise a first sequence;
the representation comprises a second sequence; and
individual members of the second sequence indicate whether respective members of the first sequence have been entered correctly.

13. A non-transitory computer-readable storage medium having stored thereon executable instructions that, as a result of being executed by one or more processors of a computer system, cause the computer system to at least:
provide a representation of a result of input received into a user interface via one or more input devices, the result comprising multiple components;
detect a change to the result resulting in a changed result;
apply a mapping to the changed result to determine a representation of the changed result, the mapping configured such that application of the mapping to different same-size sets of components results in different representations; and
provide the representation of the changed result for an update to the representation of the changed result.

14. The non-transitory computer-readable storage medium of clause 13, wherein, as a result of being executed the input is received into a field corresponding to a social security number, credit card number, or personal identification number.

15. The non-transitory computer-readable storage medium of clauses 13 or 14, wherein the instructions that cause the computer system to provide the representation of the changed result, as a result of being executed by the one or more processors, cause the computer system to transmit the representation to another computer system.

16. The non-transitory computer-readable storage medium of clause 15, wherein the input is received via a virtual or physical keyboard and the other computer system lacks any physical or virtual keyboard.

17. The non-transitory computer-readable storage medium of any of clauses 13-16, wherein:
the instructions that cause the computer system to detect the change to the result, as a result of being executed by the one or more processors, cause the computer system to obtain the changed result from a field in a user interface;
the instructions that cause the computer system to provide the representation of the changed result, as a result of being executed by the one or more processors, cause the computer system to provide the representation of the changed result in another field of the user interface.

18. The non-transitory computer-readable storage medium of any of clauses 13-17, wherein the instructions that cause the computer system to apply the mapping to the changed result to determine the representation of the changed result, as a result of being executed by the one or more processors, cause the computer system to generate the representation of the changed result based at least in part on the representation of the result.

19. The non-transitory computer-readable storage medium of any of clauses 13-18, wherein:
the instructions that cause the computer system to generate the representation of the changed result based at least in part on the representation of the result, as a result of being executed by the one or more processors, cause the computer system to input, into a function that generates message authentication codes, the result and a difference between the result and the changed result.

20. The non-transitory computer-readable storage medium of any of clauses 13-19, wherein the representation of the changed result comprises non-visual content.

21. A computer-implemented method, comprising:
providing a graphical user interface that utilizes a password entry field to control access to a resource;
receiving, from an input device of a computer system, input resulting in a current sequence of characters for the password entry field of the graphical user interface;
repeatedly polling the password entry field to monitor a state of the password entry field; and
as a result of polling the password entry field indicating a change of the state of the password entry field from a previous sequence of characters to the current sequence of characters, updating the graphical user interface to display, in another field that is different than the password entry field, the sequence of characters.

22. The computer-implemented method of clause 21, wherein the password entry field does not display the sequence of characters.

23. The computer-implemented method of clause 21 or 22, further comprising:
receiving, from the input device and via the other field, input corresponding to manipulation of the sequence of characters resulting in a modified sequence of characters; and
updating memory corresponding to the password entry field to store the modified sequence of characters.

24. The computer-implemented method of any of clauses 21-23, wherein the method further comprises transmitting a representation of the sequence of characters to another device via a short range communication channel.

25. A system, comprising:
one or more processors; and
memory storing instructions that, as a result of being executed by the one or more processors, cause the system to:
receive, via one or more input devices, input into a component of a user interface, the component being usable to enter information for an authentication claim that is submittable via the user interface;
obtain a state of a first component of the user interface, the state of the first component of the user interface defined at least in part by the input; and
update the user interface to include, in a second component, a representation of the state of the first component.

26. The system of clause 25, wherein the instructions cause the system to obtain the state of the first component of the user interface by repeatedly polling the first component of the user interface.

27. The system of clause 25 or 26, wherein the first component is a field into which an alphanumeric sequence can be entered.

28. The system of any of clauses 25-27, wherein:
the state of the user interface comprises a set of values for an authentication claim; and
the representation of the state of the first component comprises the set of values.

29. The system of any of clauses 25-28, wherein:
the state of the first component comprises a set of values for an authentication claim; and the representation of the state of the first component lacks the set of values.

30. The system of clause 29, wherein:
the instructions further comprise instructions that, as a result of being executed by the one or more processors, cause the system to apply a mapping to the set of values to determine the representation.

31. The system of any of clauses 25-30, wherein:
the instructions further comprise instructions that, as a result of being executed by the one or more processors, cause the system to implement a virtual keyboard application; and
the second component is unmanipulable by the virtual keyboard application.

32. The system of any of clauses 25-31, wherein the user interface is a graphical user interface.

33. A non-transitory computer-readable storage medium having stored thereon executable instructions that, as a result of being executed by one or more processors of a computer system, cause the computer system to at least:
monitor a state of a first component of a user interface, the first component of the user interface being such that information input into the first component of the user becomes part of an authentication claim;
detect a change to the state of the first component of the user interface; and
update the user interface to include, in a second component of the user interface, a representation of information stored in memory as a result of input entered via the first component of the user interface.

34. The non-transitory computer-readable storage medium of clause 33, wherein the instructions that cause the computer system to monitor the state of the first component, as a result of being executed by the one or more processors, cause the computer system to repeatedly poll the state of the first component.

35. The non-transitory computer-readable storage medium of clause 33 or 34, wherein the first component is a password entry field.

36. The non-transitory computer-readable storage medium of any of clauses 33-35, wherein the instructions that cause the computer system to detect a change to the state of the first component of the user interface.

37. The non-transitory computer-readable storage medium of any of clauses 33-36, wherein:
the user interface is a graphical user interface; and
the first component and the second component occupy different areas of the graphical user interface.

38. The non-transitory computer-readable storage medium of any of clauses 33-37, wherein an operating system of the computer system requires the authentication claim to be valid for access to at least some functionality of the operating system.

39. The non-transitory computer-readable storage medium of any of clauses 33-38, wherein the representation of the information stored in memory is different from the information stored in memory.

40. The non-transitory computer-readable storage medium of clause 39, wherein the instructions further comprise instructions that, as a result of being executed by the one or more processors of the computer system, cause the computer system to apply a mapping to the information stored in memory to determine the representation.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   providing a graphical user interface that utilizes a password entry field to control access to a resource;
   receiving, from an input device of a computer system, input resulting in a current sequence of characters for the password entry field of the graphical user interface;
   repeatedly polling the password entry field to monitor a state of the password entry field; and
   as a result of polling the password entry field indicating a change of the state of the password entry field from a previous sequence of characters to the current sequence of characters, updating, based at least in part on the current sequence of characters, another field in the graphical user interface that is different from the password entry field with information that indicates whether the current sequence of characters was entered correctly or incorrectly.

2. The computer-implemented method of claim 1, wherein the password entry field does not display the current sequence of characters.

3. The computer-implemented method of claim 1, further comprising:
   receiving, from the input device and via the other field, input corresponding to manipulation of the current sequence of characters resulting in a modified sequence of characters; and
   updating memory corresponding to the password entry field to store the modified sequence of characters.

4. The computer-implemented method of claim 1, wherein the method further comprises transmitting a representation of the current sequence of characters to another device via a short range communication channel.

5. A system, comprising:
   one or more processors; and
   memory storing instructions that, as a result of being executed by the one or more processors, cause the system to:
   receive, via one or more input devices, input into a component of a user interface, the component being usable to enter information for an authentication claim that is submittable via the user interface;
   obtain a state of a first component of the user interface, the state of the first component of the user interface defined at least in part by the input; and
   update, based at least in part on the input in the first component, a second component in the user interface that is different from the first component to include a representation of the state of the first component that indicates whether the input was entered correctly or incorrectly.

6. The system of claim 5, wherein the instructions cause the system to obtain the state of the first component of the user interface by repeatedly polling the first component of the user interface.

7. The system of claim 5, wherein the first component is a field into which an alphanumeric sequence can be entered.

8. The system of claim 5, wherein:
   the state of the user interface comprises a set of values for an authentication claim; and
   the representation of the state of the first component comprises the set of values.

9. The system of claim 5, wherein:
   the state of the first component comprises a set of values for an authentication claim; and
   the representation of the state of the first component lacks the set of values.

10. The system of claim 9, wherein:
    the instructions further comprise instructions that, as a result of being executed by the one or more processors, cause the system to apply a mapping to the set of values to determine the representation.

11. The system of claim 5, wherein:
    the instructions further comprise instructions that, as a result of being executed by the one or more processors, cause the system to implement a virtual keyboard application; and
    the second component is unmanipulable by the virtual keyboard application.

12. The system of claim 5, wherein the user interface is a graphical user interface.

13. A non-transitory computer-readable storage medium having stored thereon executable instructions that, as a result of being executed by one or more processors of a computer system, cause the computer system to at least:
    monitor a state of a first component of a user interface, the first component of the user interface being such that information input into the first component of the user interface becomes part of an authentication claim;
    detect a change to the state of the first component of the user interface; and
    update, based at least in part on the information inputted into the first component, a second component in the user interface that is different from the first component to include-information that indicates whether the input was entered correctly or incorrectly, the information stored in memory as a result of input entered via the first component of the user interface.

14. The non-transitory computer-readable storage medium of claim 13, wherein the instructions that cause the computer system to monitor the state of the first component, as a result of being executed by the one or more processors, cause the computer system to repeatedly poll the state of the first component.

15. The non-transitory computer-readable storage medium of claim 13, wherein the first component is a password entry field.

16. The non-transitory computer-readable storage medium of claim 13, wherein the instructions that cause the computer system to detect a change to the state of the first component of the user interface.

17. The non-transitory computer-readable storage medium of claim 13, wherein:
the user interface is a graphical user interface; and
the first component and the second component occupy different areas of the graphical user interface.

18. The non-transitory computer-readable storage medium of claim 13, wherein an operating system of the computer system requires the authentication claim to be valid for access to at least some functionality of the operating system.

19. The non-transitory computer-readable storage medium of claim 13, wherein a representation of the information stored in memory is different from the information stored in memory.

20. The non-transitory computer-readable storage medium of claim 19, wherein the instructions further comprise instructions that, as a result of being executed by the one or more processors of the computer system, cause the computer system to apply a mapping to the information stored in memory to determine the representation.

21. The computer-implemented method of claim 1, wherein the password entry field is prevented from displaying content displayed in the other field.

22. The computer-implemented method of claim 1, wherein updating the other field results in the current sequence of characters being displayed in the other field.

* * * * *